US012580647B2

(12) United States Patent
Nakamura

(10) Patent No.: US 12,580,647 B2
(45) Date of Patent: Mar. 17, 2026

(54) CONNECTION STATE IDENTIFICATION SYSTEM AND CONNECTION STATE IDENTIFICATION METHOD

(71) Applicant: NEC Corporation, Tokyo (JP)

(72) Inventor: Kohei Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 314 days.

(21) Appl. No.: 18/272,952

(22) PCT Filed: Jan. 17, 2022

(86) PCT No.: PCT/JP2022/001298
§ 371 (c)(1),
(2) Date: Jul. 18, 2023

(87) PCT Pub. No.: WO2022/168576
PCT Pub. Date: Aug. 11, 2022

(65) Prior Publication Data
US 2024/0120994 A1     Apr. 11, 2024

(30) Foreign Application Priority Data

Apr. 2, 2021     (JP) ................................. 2021-016376

(51) Int. Cl.
*H04B 10/073*          (2013.01)
*H04B 10/077*          (2013.01)

(52) U.S. Cl.
CPC ....... *H04B 10/073* (2013.01); *H04B 10/0775* (2013.01)

(58) Field of Classification Search
None
See application file for complete search history.

(56) References Cited

U.S. PATENT DOCUMENTS

| | | | | |
|---|---|---|---|---|
| 7,580,632 | B1 * | 8/2009 | Feuer .................. | H04J 14/0241 398/31 |
| 2012/0328297 | A1 * | 12/2012 | Hoshida .............. | H04J 14/0257 398/85 |
| 2015/0155934 | A1 * | 6/2015 | Nakagawa ......... | H04B 10/0795 398/25 |

FOREIGN PATENT DOCUMENTS

| | | |
|---|---|---|
| JP | H02-005640 A | 1/1990 |
| JP | H09-289494 A | 11/1997 |

(Continued)

OTHER PUBLICATIONS

International Search Report for PCT Application No. PCT/JP2022/001298, mailed on Apr. 12, 2022.

(Continued)

*Primary Examiner* — Darren E Wolf

(57) ABSTRACT

A connection state identification system includes an identification information addition means and an identification information acquisition means. When an inspection optical signal, which is an optical signal for inspection transmitted by a first optical communication device to a second optical communication device, is received by the second optical communication device over inter-optical communication device optical paths, which are the optical paths included in the undersea optical cable system between the optical communication devices, the identification information addition means adds, to an unassigned frequency band of the inspection optical signal, the unassigned frequency band being a frequency band other than a frequency band assigned to optical communication, identification information differing for each inter-optical communication device optical path through which the inspection optical signal passes. The identification information acquisition means outputs the identification information in the inspection optical signal received by the second optical communication device.

11 Claims, 26 Drawing Sheets

BRANCHING UNIT B

(56)     References Cited

FOREIGN PATENT DOCUMENTS

| | | | |
|---|---|---|---|
| JP | H11-215059 | A | 8/1999 |
| JP | 2016-208276 | A | 12/2016 |
| JP | 2019-004336 | A | 1/2019 |

OTHER PUBLICATIONS

English translation of Written opinion for PCT Application No. PCT/JP2022/001298, mailed on Apr. 12, 2022.

* cited by examiner

Fig.2

OPTICAL COMMUNICATION DEVICE K

FK1 ↑

FK2 ↓

10

OPTICAL SIGNAL
TRANSMISSION UNIT

20

OPTICAL SIGNAL
RECEPTION UNIT

Fig.5

OPTICAL SIGNAL RECEPTION UNIT 20

FK2

OPTICAL
RECEPTION UNIT  21

ANALYSIS UNIT  22

STORAGE UNIT  26

OUTPUT UNIT  27

INSPECTION OPTICAL SIGNAL ik1 FROM
OPTICAL COMMUNICATION DEVICE K1

INSPECTION OPTICAL SIGNAL ik2 FROM
OPTICAL COMMUNICATION DEVICE K2

INSPECTION OPTICAL SIGNAL ik3 FROM
OPTICAL COMMUNICATION DEVICE K3

INSPECTION OPTICAL SIGNAL ik4 FROM
OPTICAL COMMUNICATION DEVICE K4

INSPECTION OPTICAL SIGNAL ik1 FROM
OPTICAL COMMUNICATION DEVICE K1

INSPECTION OPTICAL SIGNAL ik2 FROM
OPTICAL COMMUNICATION DEVICE K2

INSPECTION OPTICAL SIGNAL ik3 FROM
OPTICAL COMMUNICATION DEVICE K3

INSPECTION OPTICAL SIGNAL ik4 FROM
OPTICAL COMMUNICATION DEVICE K4

Fig.10

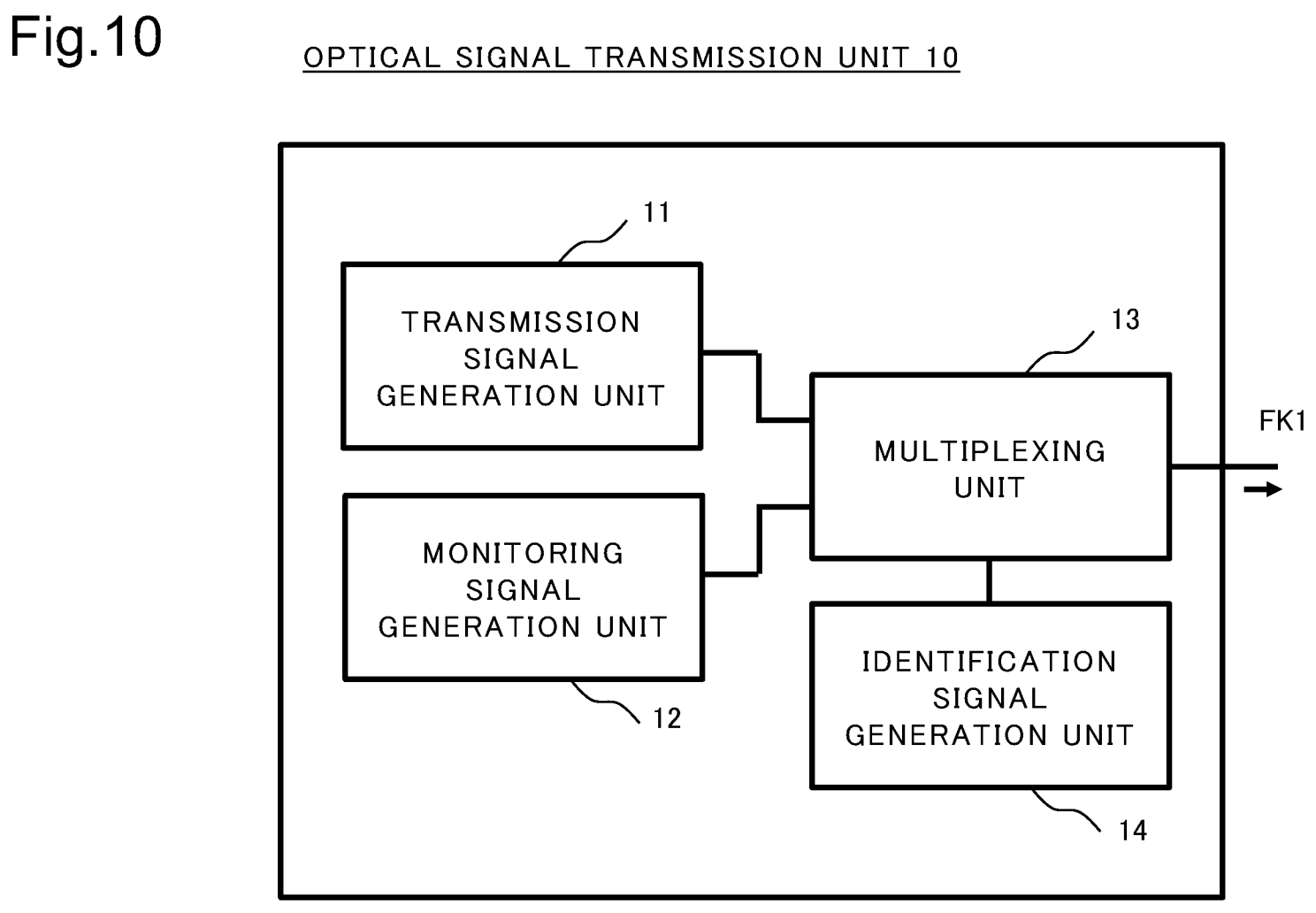

OPTICAL SIGNAL TRANSMISSION UNIT 10

FK1

MULTIPLEXING UNIT    13

IDENTIFICATION SIGNAL GENERATION UNIT    14

TRANSMISSION SIGNAL GENERATION UNIT    11

MONITORING SIGNAL GENERATION UNIT    12

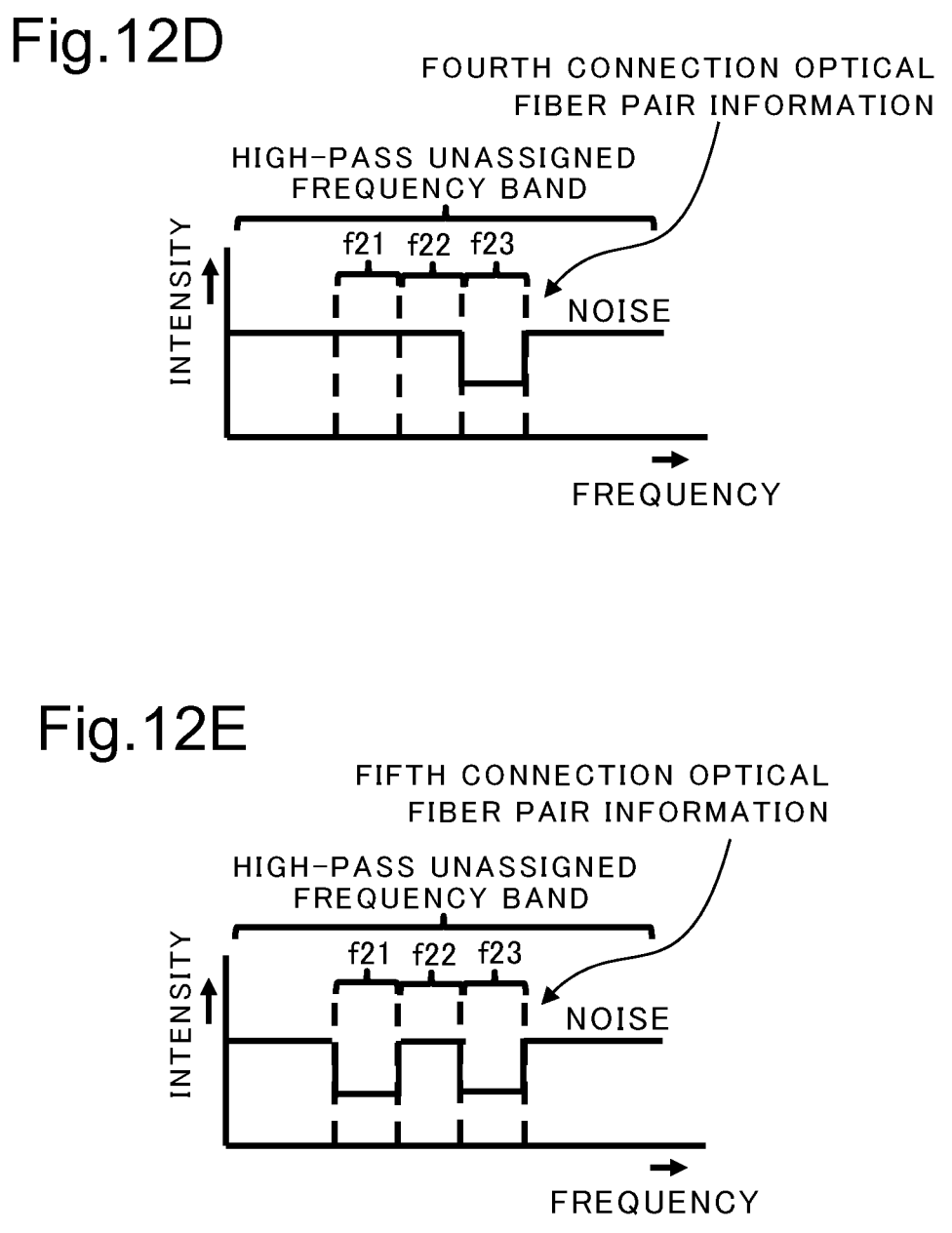

FOURTH CONNECTION OPTICAL
FIBER PAIR INFORMATION

HIGH-PASS UNASSIGNED
FREQUENCY BAND f21  f22  f23

INTENSITY

NOISE

FREQUENCY

Fig.12E

FIFTH CONNECTION OPTICAL
FIBER PAIR INFORMATION

HIGH-PASS UNASSIGNED
FREQUENCY BAND f21  f22  f23

INTENSITY

NOISE

FREQUENCY

Fig.13

| CONNECTION OPTICAL FIBER PAIR | | KIND OF CONNECTION OPTICAL FIBER PAIR INFORMATION |
|---|---|---|
| FIRST OPTICAL FIBER | SECOND OPTICAL FIBER | |
| F11 | F51 | FIRST CONNECTION OPTICAL FIBER PAIR INFORMATION |
| F52 | F12 | |
| F51 | F21 | SECOND CONNECTION OPTICAL FIBER PAIR INFORMATION |
| F22 | F52 | |
| F11 | F31 | THIRD CONNECTION OPTICAL FIBER PAIR INFORMATION |
| F32 | F12 | |
| F51 | F32 | |
| F31 | F52 | |
| F51 | F41 | FOURTH CONNECTION OPTICAL FIBER PAIR INFORMATION |
| F42 | F52 | |
| F21 | F42 | FIFTH CONNECTION OPTICAL FIBER PAIR INFORMATION |
| F41 | F22 | |

Fig.14

| | | RECEPTION OPTICAL COMMUNICATION DEVICE | | | |
| --- | --- | --- | --- | --- | --- |
| | | K1 | K2 | K3 | K4 |
| TRANSMISSION OPTICAL COMMUNICATION DEVICE | K1 | | p12 | p13 | p14 |
| | K2 | p21 | | p23 | p24 |
| | K3 | p31 | p32 | | p34 |
| | K4 | p41 | p42 | p43 | |

Fig.18

CONNECTION STATE IDENTIFICATION SYSTEM AND CONNECTION STATE IDENTIFICATION METHOD

This application is a National Stage Entry of PCT/JP2022/001298 filed on Jan. 17, 2022, which claims priority from JP Patent Application 2021-016376 filed on Feb. 4, 2021, the contents of all of which are incorporated herein by reference, in their entirety.

TECHNICAL FIELD

The present invention relates to a connection state determination system and a connection state determination method that can determine a connection state of an optical path by a branching unit.

BACKGROUND ART

In a submarine optical cable system for performing optical communication between land terminals by using a submarine optical cable, a branching unit for switching an optical path may be installed. In that case, a switching operation of an optical switch included in the branching unit needs to be confirmed at the land terminal. In order to do that, it is essential to recognize a connection state of an optical path in the branching unit at the land station.

In order to confirm the connection state, generally, the optical switch is first switched by transmitting a command signal from an optical communication device installed at the land terminal to the branching unit. Then, the connection state is confirmed by confirming whether a communication optical signal being an optical signal actually used for optical communication is properly transmitted to the optical device at the land terminal on the other side.

In recent years, an open cable system for individually introducing, from different manufacturers, an optical submarine cable system formed of an optical submarine cable, an optical submarine device including a branching unit, and the like, and an optical communication device installed at a land terminal is becoming the mainstream. In the open cable system, generally, the optical communication device for actually performing communication between land terminals is not introduced at a point in time at which the optical submarine cable system is introduced. In that case, an inspection of a transmission characteristic of the optical submarine cable system is performed by transmitting and receiving an optical signal for an inspection by the optical communication device installed at each land terminal.

FIG. 1 is a schematic diagram illustrating a configuration of an optical communication system 100 being an example of a general optical communication system in which an optical submarine cable system and an optical communication device that transmits and receives an optical signal for an inspection are combined. The optical communication system 100 is in a state before an optical communication device for actually performing optical communication is installed at each land terminal. Optical communication devices K1 to K4 illustrated in FIG. 1 include a function of only transmitting and receiving an optical signal for an inspection, and does not transmit and receive a communication optical signal for actually performing optical communication.

Further, FIG. 2 is a schematic diagram illustrating a configuration of an optical communication device K being an example of each of the optical communication devices K1 to K4 illustrated in FIG. 1. Further, FIG. 3 is an image diagram illustrating a frequency characteristic of intensity (hereinafter simply referred to as a "frequency characteristic") of an inspection optical signal ik being an example of an inspection optical signal transmitted from an optical signal transmission unit 10. Further, FIG. 4 is a schematic diagram illustrating a configuration example of the optical signal transmission unit 10 illustrated in FIG. 2. Further, FIG. 5 is a schematic diagram illustrating a configuration example of an optical signal reception unit 20 illustrated in FIG. 2.

As illustrated in FIG. 1, the optical communication system 100 includes land terminals T1 to T4 and an optical submarine cable system CS. The optical communication system 100 is used for transmitting and receiving an optical signal for an inspection (inspection optical signal) between land terminals, and inspecting normality of an operation of the optical submarine cable system CS from a change from a transmission time in a frequency characteristic of the inspection optical signal received by each land terminal.

The optical submarine cable system CS includes branching units B1 and B2, and optical fibers F11, F12, F21, F22, F31, F32, F41, F42, F51, and F52. Herein, each arrow illustrated in FIG. 1 indicates a traveling direction of an optical signal in each optical fiber. The land terminals T1 to T4 include the optical communication devices K1 to K4. Each of the optical fibers F11, F12, F21, F22, F31, F32, F41, F42, F51, and F52 is an optical fiber including one or a plurality of optical fiber core wires, or a group of a plurality of such optical fibers.

The branching unit B1 switches a connection destination of a first optical path to either a third optical path or a fifth optical path. Herein, the first optical path is an optical path including the optical fibers F11 and F12. Further, the third optical path is an optical path including the optical fibers F31 and F32. Further, the fifth optical path is an optical path including the optical fibers F51 and F52.

The branching unit B2 switches a connection destination of a second optical path to either a fourth optical path or the fifth optical path. Herein, the second optical path is an optical path including the optical fibers F21 and F22. Further, the fourth optical path is an optical path including the optical fibers F41 and F42.

Each of the optical communication devices K1 to K4 in FIG. 1 includes the optical signal transmission unit 10 and the optical signal reception unit 20 as in the optical communication device K illustrated in FIG. 2.

An optical signal for an inspection (inspection optical signal) transmitted from the optical signal transmission unit 10 includes a transmission optical signal and a monitoring optical signal in different frequency bands as in the inspection optical signal ik in FIG. 3.

The transmission optical signal is an optical signal having a frequency characteristic same as or similar to a transmission optical signal not being used for an inspection and being used for transmission by an optical communication device (actual optical communication device) used for actual communication. The actual optical communication device is planned to be installed at each land terminal and connected to the optical submarine cable system CS in the future. Note that information carried by the transmission optical signal does not need to particularly have a meaning.

The monitoring optical signal is an optical signal having a frequency characteristic same as an optical signal for monitoring being used for transmission by the actual optical communication device. Herein, the optical signal for monitoring is, for example, a supervisory (SV) signal. Information carried by the monitoring optical signal does not need to particularly have a meaning.

The inspection optical signal ik has an unassigned frequency band being a frequency band not used for the transmission optical signal and the monitoring optical signal. The unassigned frequency band is formed of a low-pass unassigned frequency band and a high-pass unassigned frequency band. The low-pass unassigned frequency band is an unassigned frequency band being a frequency band lower than a frequency band used for the transmission optical signal and the monitoring optical signal. The high-pass unassigned frequency band is an unassigned frequency band being a frequency band higher than a frequency band used for the transmission optical signal and the monitoring optical signal.

Note that noise is present in the inspection optical signal ik. The noise is, for example, ASE noise. Herein, ASE is short for amplified spontaneous emission.

As illustrated in FIG. 4, the optical signal transmission unit 10 in FIG. 2 includes a transmission signal generation unit 11, a monitoring signal generation unit 12, and a multiplexing unit 13. The transmission signal generation unit 11 generates a transmission signal being an optical signal of each frequency constituting the transmission optical signal in FIG. 3, and inputs the transmission signal to the multiplexing unit 13. The monitoring signal generation unit 12 generates a monitoring signal being an optical signal of each frequency constituting the monitoring optical signal in FIG. 3, and inputs the monitoring signal to the multiplexing unit 13.

The multiplexing unit 13 multiplexes each of a signal of each frequency of the transmission signal being input from the transmission signal generation unit 11 and a signal of each frequency of the monitoring signal being input from the monitoring signal generation unit 12, and generates the inspection optical signal ik in FIG. 3. The multiplexing unit 13 causes the generated inspection optical signal ik to be incident on an optical fiber FK1. The optical fiber FK1 is the optical fibers F11, F22, F32, and F42 in this order when the optical communication device K in FIG. 2 is the optical communication devices K1, K2, K3, and K4 in FIG. 1.

As illustrated in FIG. 5, the optical signal reception unit 20 in FIG. 2 includes an optical reception unit 21, an analysis unit 22, a storage unit 26, and an output unit 27. The optical reception unit 21 separates a wavelength of the inspection optical signal ik (reception inspection optical signal) in FIG. 3 being incident from an optical fiber FK2, and then inputs the inspection optical signal ik to the analysis unit 22. The optical fiber FK2 is the optical fibers F12, F21, F31, and F41 in this order when the optical communication device K in FIG. 2 is the optical communication devices K1, K2, K3, and K4 in FIG. 1.

The analysis unit 22 acquires a frequency characteristic of the received inspection optical signal (reception inspection optical signal) by measuring intensity of each optical signal having a wavelength separated, and stores the frequency characteristic in the storage unit 26.

Note that the optical signal reception unit 20 performs the operation described above by a configuration similar to a configuration of an optical spectrum analyzer on the market, for example.

Further, the analysis unit 22 causes the output unit 27 to output the frequency characteristic of the acquired reception inspection optical signal in response to an instruction from the outside, for example.

The storage unit 26 holds a program and information for the optical signal reception unit 20 to perform the operation described above. The storage unit 26 transmits information instructed by each configuration of the optical signal reception unit 20 to an instructed configuration. The storage unit 26 stores the information instructed by each configuration of the optical signal reception unit 20.

The output unit 27 is, for example, a display device or a transmission device. The output unit 27 outputs information instructed by each configuration of the optical signal reception unit 20.

Herein, PTL 1 discloses a probe generation device that performs polarization separation on an optical signal, adjusts the optical signal to have a single polarization direction, performs multiplexing and separation, modulates intensity by a pilot signal, multiplexes each optical signal adjusted to have a different polarization direction, and generates and outputs an optical signal for a probe.

Further, PTL 2 discloses a line monitoring device for a wavelength multiplex optical submarine cable network that causes a transmitter provided in a transmission terminal device to output a line monitoring signal, extracts the line monitoring signal from a signal fed back through an optical loop back circuit of an optical submarine repeater, and detects a fault in a line.

CITATION LIST

Patent Literature

PTL 1: Japanese Unexamined Patent Application Publication No. 2016-208276
PTL 2: Japanese Unexamined Patent Application Publication No. H09-289494

SUMMARY OF INVENTION

Technical Problem

As described in the section of Background Art, for confirmation of a connection state of an optical path in a branching unit, the connection state is generally confirmed by confirming whether a communication optical signal being an optical signal actually used for optical communication is properly transmitted to an optical device at a land terminal on the other side. In order to transmit and receive the communication optical signal, an optical communication device for actually performing optical communication needs to be installed in an optical submarine cable system.

Thus, there is a problem that a supplier and the like of an optical submarine cable cannot confirm a connection state of an optical path in a branching unit until the optical communication device for actually performing optical communication is supplied and installed.

Herein, PTL 1 discloses a configuration for superimposing a path identifier (ID) on an optical signal with an unused wavelength and identifying a path. However, PTL 1 is related to a configuration for measuring "waveform deterioration due to polarization dependence", and does not mention that a state of a path (a branching state of a branching unit) is recognized. Further, a path ID is formed into data in an optical signal, and the path ID cannot be known from a spectrum of the optical signal in the configuration of PTL 1.

Further, PTL 2 is related to the line monitoring system in an optical submarine cable network. In PTL 2, a line monitoring signal is electrically superimposed on a main signal, and PTL 2 does not disclose path monitoring based on a spectrum of a signal outside a band.

Therefore, even when the inventions in PTLs 1 and 2 are combined, it is conceivable that a connection state of an optical path in a branching unit cannot be judged at a land terminal that receives an inspection optical signal.

The present invention has an object to provide a connection state determination system and the like that are able to confirm a connection state of an optical path by a branching unit at a time of an operation inspection of an optical submarine cable system.

Solution to Problem

A connection state determination system according to the present invention includes: an identification information addition means for adding identification information different for each inter-optical communication device optical path through which an inspection optical signal being an optical signal for an inspection to be transmitted from a first optical communication device to a second optical communication device passes, to an unassigned frequency band being a frequency band other than a frequency band assigned to optical communication at a time of reception of the inspection optical signal by the second optical communication device, by the inter-optical communication device optical path being an optical path including an optical fiber between optical communication devices and being included in an optical submarine cable system, the optical submarine cable system including a submarine optical cable including the optical path, and a branching unit that switches connection of the optical path; and an identification information acquisition means for outputting the identification information about the inspection optical signal received by the second optical communication device.

Advantageous Effects of Invention

A connection state determination system and the like according to the present invention are able to confirm a connection state of an optical path by a branching unit at a time of an operation inspection of an optical submarine cable system.

BRIEF DESCRIPTION OF DRAWINGS

FIG. 2 is a schematic diagram illustrating a configuration example of an optical communication device.

FIG. 5 is a schematic diagram illustrating a configuration example of an optical signal reception unit.

FIG. 10 is a schematic diagram illustrating a configuration example of an optical signal transmission unit according to the third example embodiment.

FIG. 11 is a schematic diagram illustrating a configuration example of a branching unit according to a fourth example embodiment.

FIG. 12D is a schematic diagram illustrating an example of fourth connection optical fiber pair information.

FIG. 12E is a schematic diagram illustrating an example of fifth connection optical fiber pair information.

FIG. 13 is a schematic diagram illustrating an example of assignment to each connection optical fiber pair in the branching unit.

FIG. 14 is a diagram illustrating a correspondence example between a combination of a transmission optical communication device and a reception optical communication device, and a high-pass unassigned frequency band of an inspection optical signal received by the reception optical communication device.

FIG. 18 is a schematic diagram illustrating a configuration example of an optical communication system according to a fifth example embodiment.

EXAMPLE EMBODIMENT

First Example Embodiment

In an optical communication system according to the present example embodiment, transmission optical communication device identification information being information for identifying an optical communication device (transmission optical communication device) being a transmission source of an inspection optical signal transmitted from the optical communication device is provided to an unassigned frequency band of the inspection optical signal. In the optical communication system according to the present example embodiment, the transmission optical communication device identification information is added by attenuating noise in the unassigned frequency band by the transmission optical communication device. In this way, in the optical communication system according to the present example embodiment, an optical communication device that has received the inspection optical signal can determine the optical communication device that has transmitted the inspection optical signal by the transmission optical communication device identification information. In this way, in the optical communication system according to the present example embodiment, the optical communication device that has received the inspection optical signal can recognize a switching state of an optical path in a branching unit through which the inspection optical signal has passed.

Configuration and Operation

Figure 1:
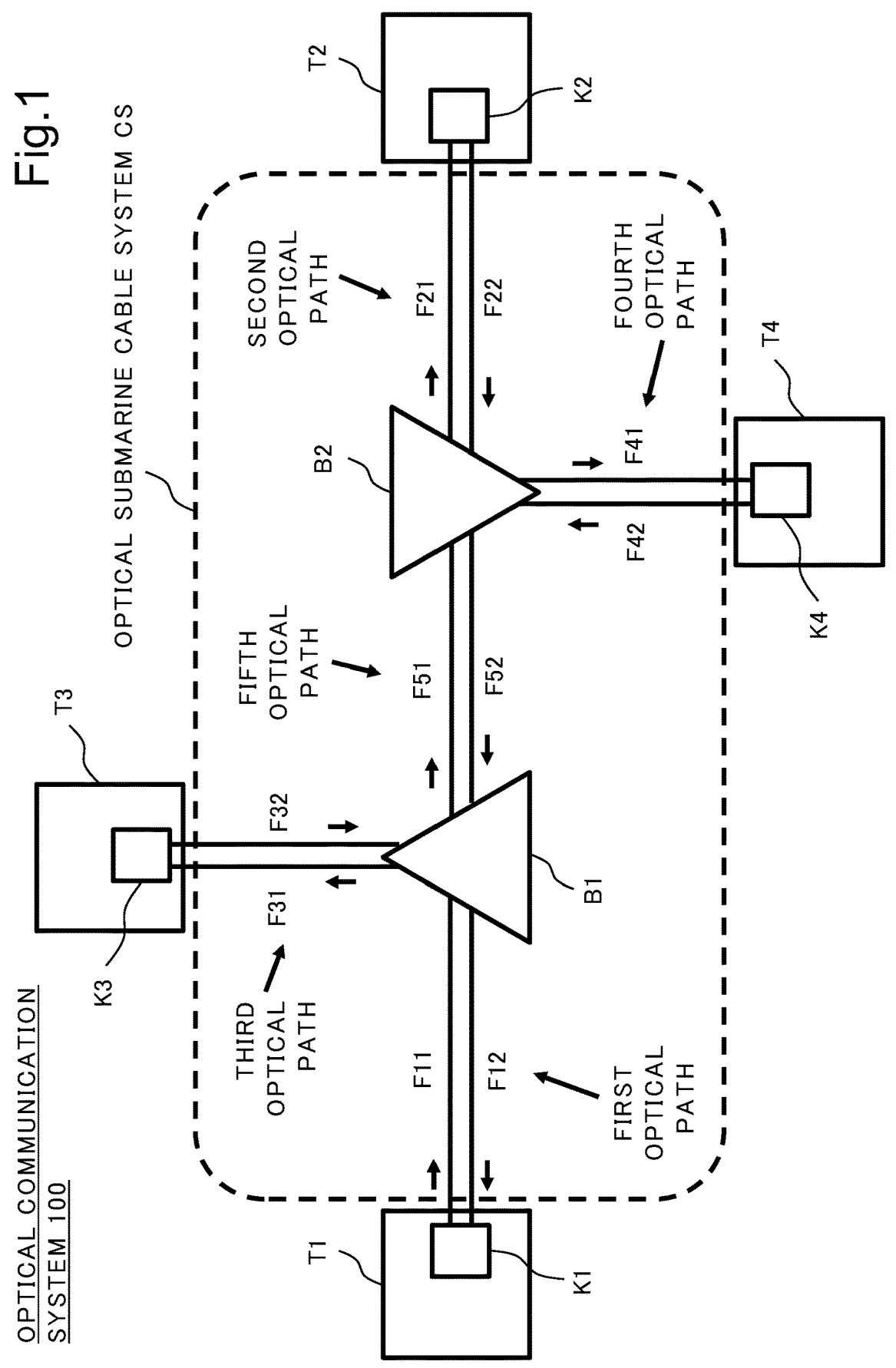
FIG. 1 is a schematic diagram illustrating a configuration example of a general optical communication system.

A configuration example of the optical communication system according to the present example embodiment is the optical communication system 100 illustrated in FIG. 1. A configuration example of each of the optical communication devices K1 to K4 in FIG. 1 according to the present example embodiment is the optical communication device K in FIG. 2. The optical communication device K according to the present example embodiment is different in the following points from that described in the section of Background Art. Hereinafter, points of the optical communication device K according to the present example embodiment different from that described in the section of Background Art will be mainly described.

First, an inspection optical signal transmitted from the optical communication device K according to the present example embodiment will be described. FIG. 6A-FIG. 6D are image diagrams illustrating inspection optical signals ik1, ik2, ik3, and ik4 being an example of the inspection optical signal according to the present example embodiment. The inspection optical signals ik1, ik2, ik3, and ik4 in this order are inspection optical signals transmitted from the optical communication devices K1, K2, K3, and K4 in FIG. 1.

The inspection optical signals ik2, ik3, and ik4 in this order includes a portion with reduced noise in each of a frequency band f1, frequency bands f1 and f2, and frequency bands f1, f2, and f3. Herein, the frequency bands f1, f2, and f3 are frequency bands that do not overlap each other in a high-pass unassigned frequency band. The inspection optical signal ik1 does not have a frequency band with reduced noise in the high-pass unassigned frequency band.

Figure 2:
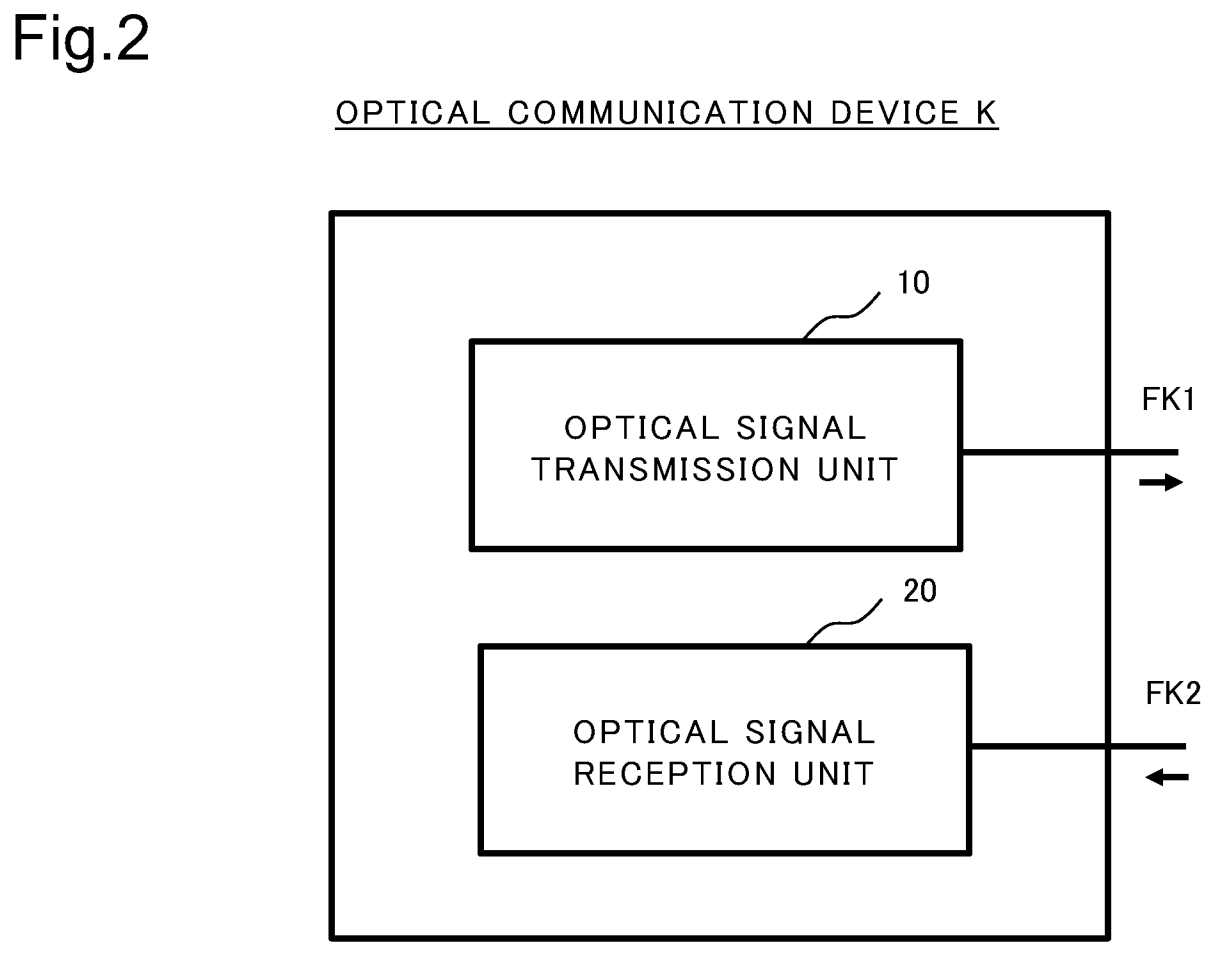

When the inspection optical signals ik1 to ik4 in FIG. 6A-FIG. 6D are used, an inspection optical signal received by the optical signal reception unit 20 in FIG. 2 has the high-pass unassigned frequency band associated with the inspection optical signals ik1 to ik4. As described in the section of Background Art, the optical signal reception unit 20 in FIG. 2 can acquire a frequency characteristic of an inspection optical signal. Thus, the optical signal reception unit 20 can detect a difference in above-described transmission optical communication device identification information indicated by whether a portion with reduced noise is provided in the frequency band f1, the frequency bands f1 and f2, and the frequency bands f1, f2, and f3 or the portion with reduced noise is not provided. In that case, which of the optical communication devices K1, K2, K3, and K4 transmits the inspection optical signal can be determined from the detection result.

Note that the optical signal reception unit 20 according to the present example embodiment may not be that described in the section of Background Art, and may be dedicated for measuring a frequency characteristic in a high-pass unassigned frequency band.

Figure 6A:
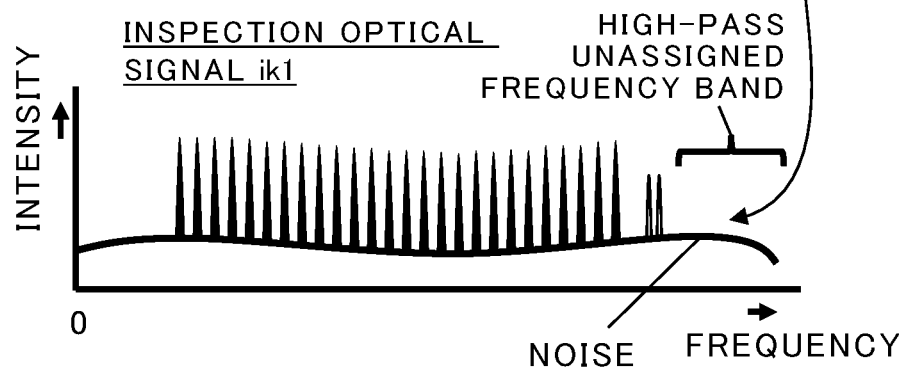
FIG. 6A is an image diagram illustrating an example of an inspection optical signal ik1 from optical communication device K1, according to a first example embodiment.
Figure 6B:
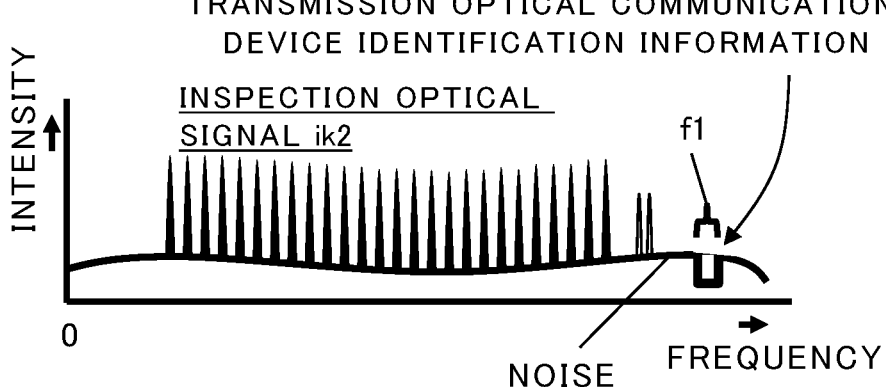
FIG. 6B is an image diagram illustrating an example of an inspection optical signal ik2 from optical communication device K2, according to a first example embodiment.
Figure 6C:
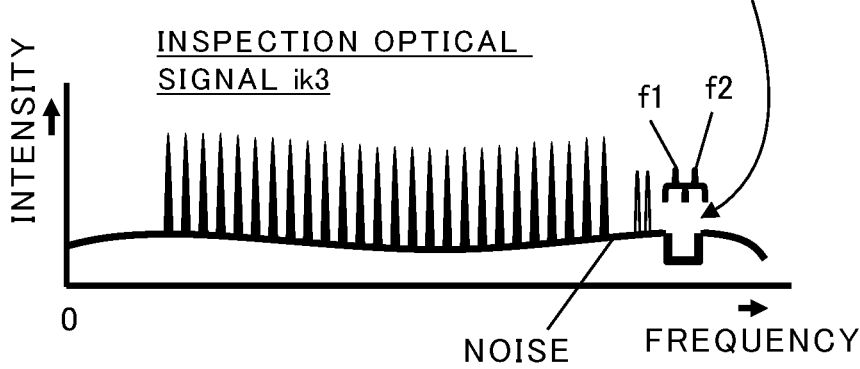
FIG. 6C is an image diagram illustrating an example of an inspection optical signal ik3 from optical communication device K3, according to a first example embodiment.
Figure 6D:
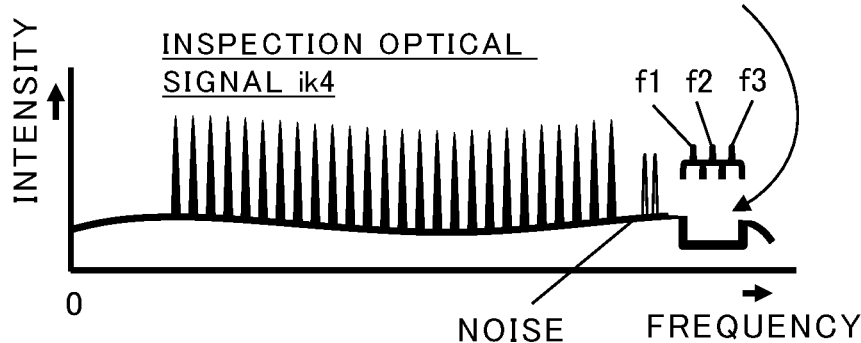
FIG. 6D is an image diagram illustrating an example of an inspection optical signal ik4 from optical communication device K4, according to a first example embodiment.
Figure 7:
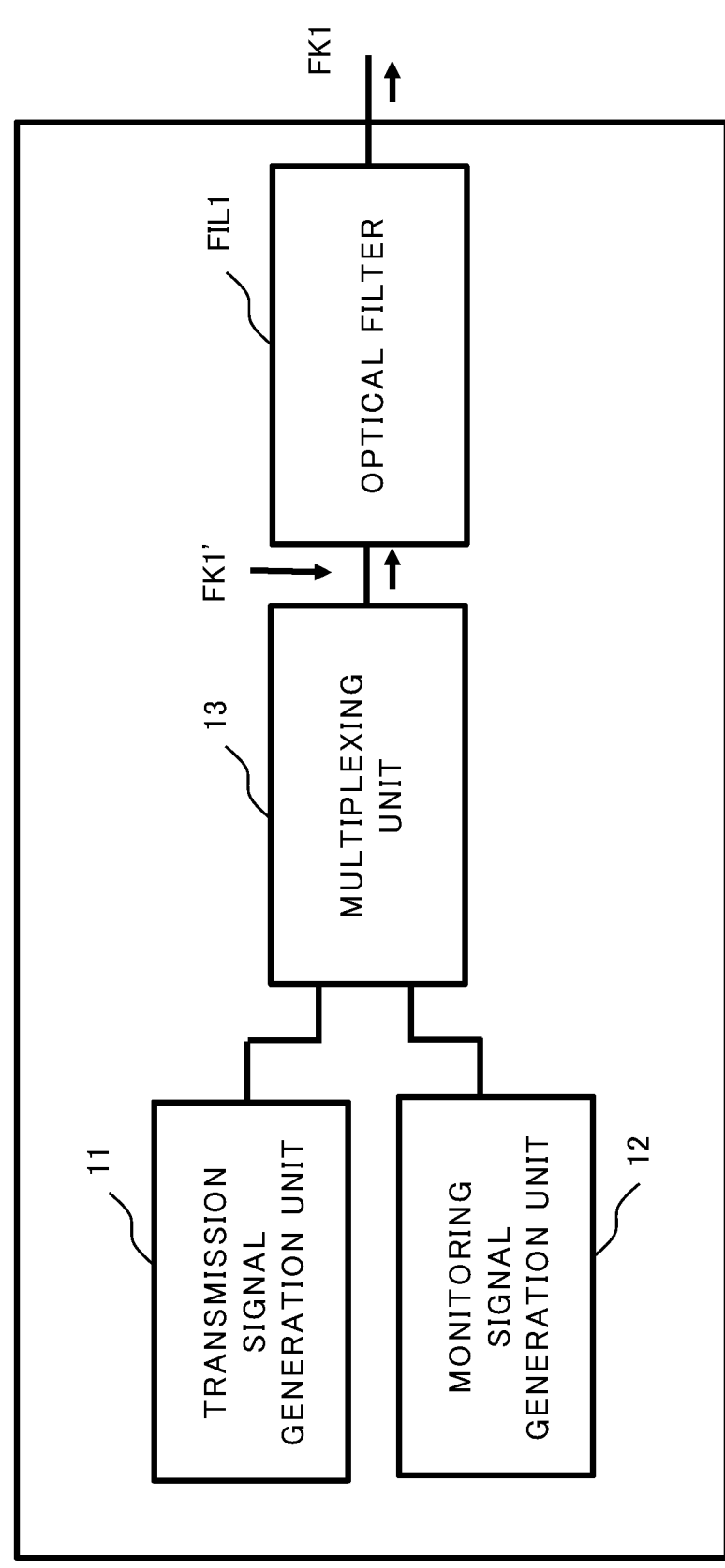
FIG. 7 is a schematic diagram illustrating a configuration example of an optical signal transmission unit according to the first example embodiment.

The inspection optical signals ik2 to ik4 in FIG. 6B-FIG. 6D can be generated by attenuating noise in a predetermined frequency band by an optical filter. FIG. 7 is a schematic diagram illustrating a configuration of the optical signal transmission unit 10 being an optical signal transmission unit including an optical filter.

Figure 3:
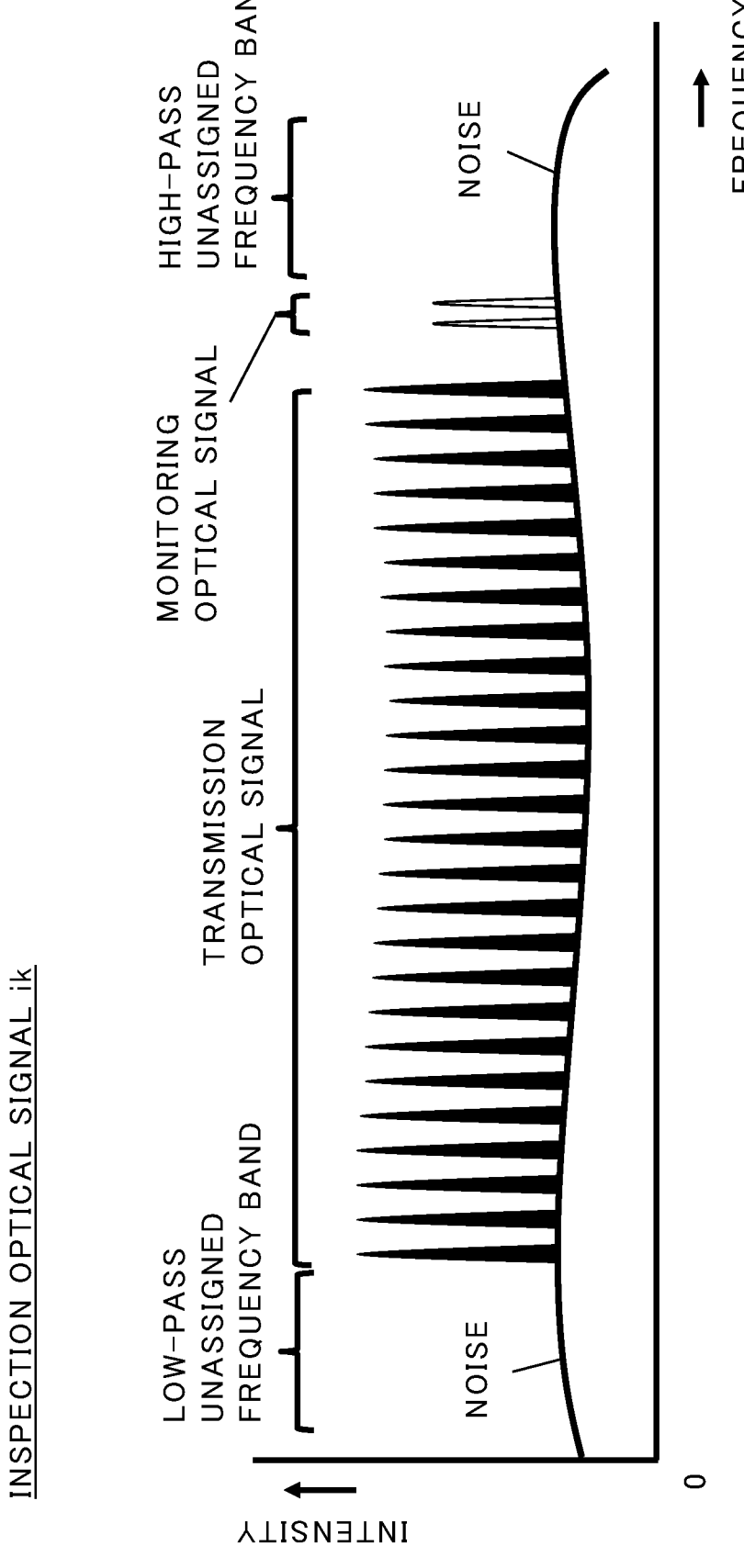
FIG. 3 is an image diagram illustrating an example of a frequency distribution of intensity of an inspection optical signal.
Figure 4:
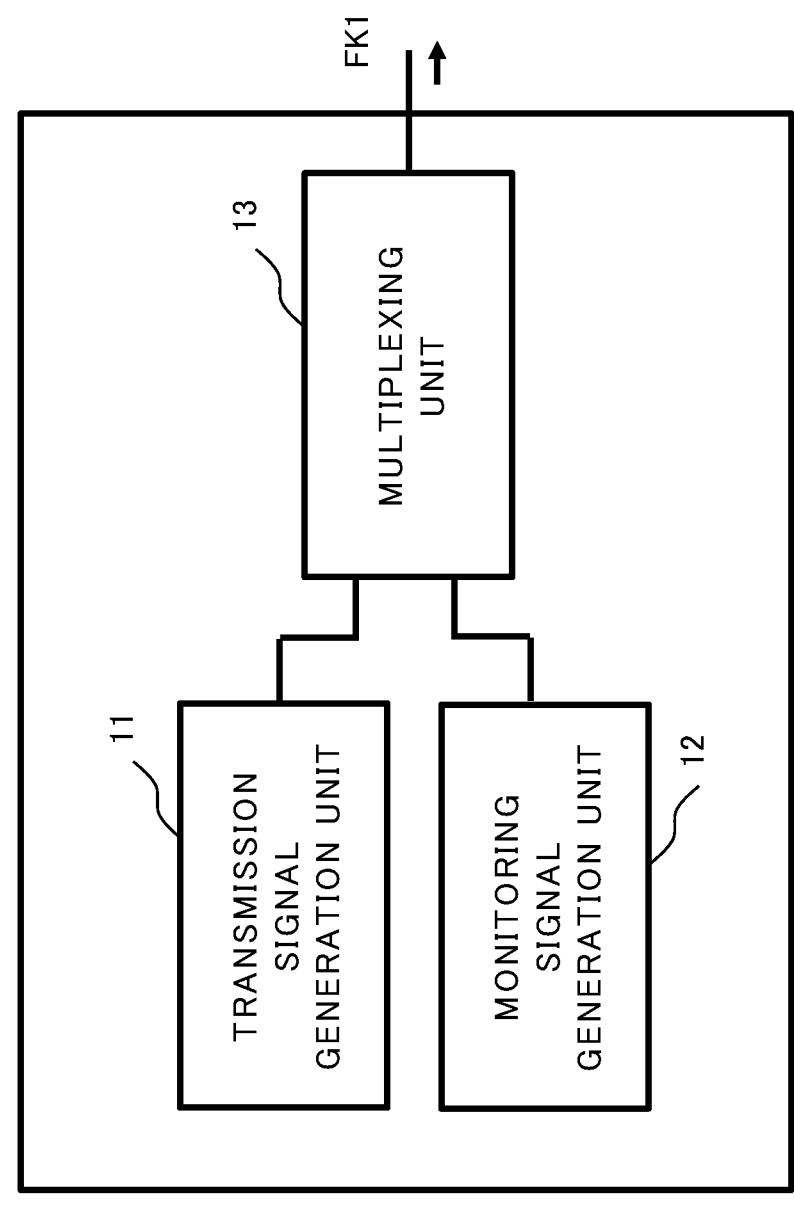
FIG. 4 is a schematic diagram illustrating a configuration example of an optical signal transmission unit.

The optical signal transmission unit 10 in FIG. 7 includes an optical filter FIL1 in addition to the configuration included in the optical signal transmission unit 10 in FIG. 4. FIL 1 reduces noise of the inspection optical signal ik in FIG. 3 being incident from the multiplexing unit 13 through an optical fiber FK1' in a frequency band of at least any of the frequency bands f1, f2, and f3 in the high-pass unassigned frequency band, and generates the inspection optical signals ik2 to ik4 in FIG. 6B-FIG. 6D.

Note that the inspection optical signal ik1 in FIG. 6A is generated by the optical signal transmission unit 10 that is illustrated in FIG. 4 and does not include FIL1.

The inspection optical signals ik1 to ik4 generated by the optical signal transmission unit 10 are incident on the optical fiber FK1. The optical fiber FK1 is the optical fibers F11, F22, F32, and F42 in this order when the optical communication device K in FIG. 2 is the optical communication devices K1, K2, K3, and K4 in FIG. 1.

Note that whether FIL1 in FIG. 7 is installed in a housing including the transmission signal generation unit 11, the monitoring signal generation unit 12, and the multiplexing unit 13 is optional.

Figure 5:
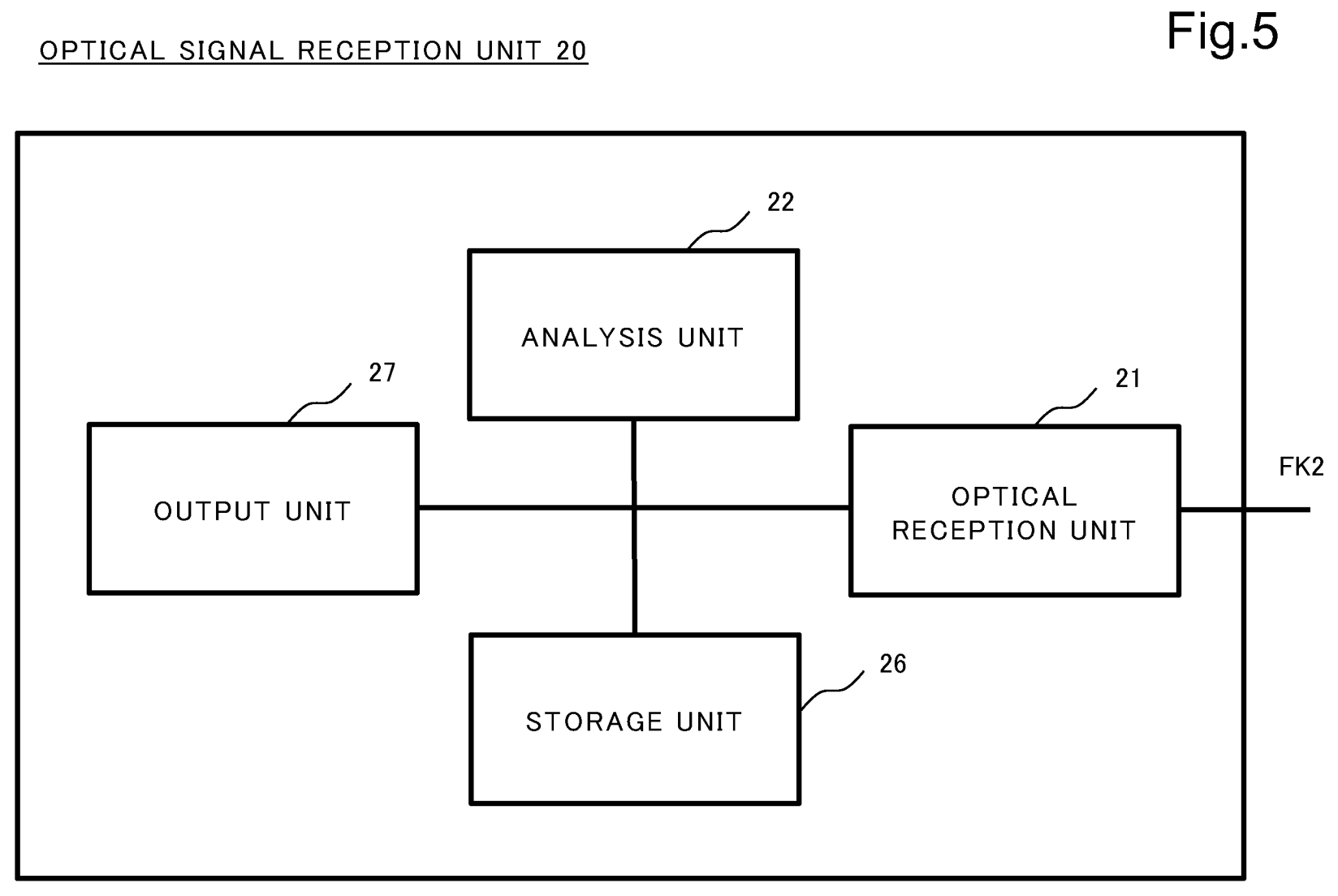

The configuration example of the optical signal reception unit 20 included in the optical communication device K according to the present example embodiment illustrated in FIG. 2 is the same as that illustrated in FIG. 5. An operator and the like determine, from the transmission optical communication device identification information (see FIG. 6A-FIG. 6D) in the high-pass unassigned frequency band of the received inspection optical signal being output from the output unit 27, an optical communication device being a transmission source of the inspection optical signal.

A combination of an optical communication device being a reception destination of an inspection optical signal and an optical communication device being a transmission source of the inspection optical signal, and an optical path through which the inspection optical signal has passed have a one-to-one relationship. For example, an operator and the like hold correspondence data between the combination and the optical path through which the inspection optical signal has passed. In that case, the operator and the like can determine, from the correspondence data, the optical path through which the inspection optical signal has passed.

Furthermore, an optical path through which an inspection optical signal has passed and an optical fiber pair connected to each optical switch of a branching unit belonging to the optical path have a one-to-one relationship. For example, an operator and the like hold correspondence data between the optical path and a connection state of each optical switch of the branching unit belonging to the optical path. In that case, the operator and the like can determine, from the correspondence data, the optical fiber pair connected to each optical switch of the branching unit belonging to the optical path. The optical fiber pair indicates a connection state of each optical switch.

Note that the number of branching units and the number of optical communication devices included in the optical communication system according to the present example embodiment are not limited to those in FIG. 1.

Further, in the description above, the example in which the transmission optical communication device identification information described above is provided in the high-pass unassigned frequency band of the unassigned frequency band is described. However, a frequency band in which the transmission optical communication device identification information is provided may be any frequency band as long as the frequency band is the unassigned frequency band. The transmission optical communication device identification information may be provided in a low-pass unassigned frequency band. Alternatively, the transmission optical communication device identification information may be provided in both of the low-pass unassigned frequency band and the high-pass unassigned frequency band. When the transmission optical communication device identification information is provided in both of the low-pass unassigned frequency band and the high-pass unassigned frequency band, setting of more kinds of pieces of the transmission optical communication device identification information can be achieved. This advantageously works when the optical communication system according to the present example embodiment includes a greater number of optical communication devices.

Note that, similarly to provision of the transmission optical communication device identification information to the high-pass unassigned frequency band, provision of the transmission optical communication device identification information to the low-pass unassigned frequency band can be achieved by the optical filter FIL1 in FIG. 7.

Further, the transmission optical communication device identification information may be provided to frequency bands that do not overlap each other in each transmission optical communication device.

Further, the optical communication device identification information may indicate a plurality of transmission optical communication devices by a degree of a reduction in noise even with the same frequency band. In that case, setting of more kinds of pieces of the transmission optical communication device identification information can be achieved. This is advantageous when the optical communication system according to the present example embodiment includes a greater number of optical communication devices.

Effect

In the optical communication system according to the present example embodiment, transmission optical communication device identification information being information for distinguishing an optical communication device being a transmission source of an inspection optical signal transmitted from the optical communication device is provided to an unassigned frequency band of the inspection optical signal. In the optical communication system according to the present example embodiment, the optical communication device being the transmission source of the inspection optical signal provides the transmission optical communication device identification information by reducing noise in a predetermined frequency band of the unassigned frequency band. In this way, in the optical communication system according to the present example embodiment, the optical communication device that has transmitted the inspection optical signal can be determined by the transmission optical communication device identification information included in output information of an optical communication device that has received the inspection optical signal. When the optical communication device being the transmission source of the inspection optical signal and the optical communication device being a reception destination are determined, a switching state of a branching unit present in an optical path between the two optical communication devices is determined.

Thus, in the optical communication system according to the present example embodiment, the switching state of the optical path in the branching unit through which the inspection optical signal has passed can be recognized by the transmission optical communication device identification information included in the output information of the optical communication device that has received the inspection optical signal.

Note that, with a configuration of an optical submarine cable system being more complicated, even when a transmission optical communication device is determined in a reception optical communication device of an inspection optical signal, a connection state of an optical fiber of an optical switch in each branching unit may not be determined. For example, the reason is that, when an inspection optical signal reaches a reception optical communication device via a branching unit, a different path via the same branching unit in the same connection state may be present. In that case, even when an optical path through which the inspection optical signal has passed can be determined, a connection state of each branching unit cannot be determined. In that case, a connection state of each branching unit can be determined by collecting and integrally judging information about a transmission optical communication device in each reception optical communication device. For the integration judgment, for example, use of artificial intelligence and the like are conceivable.

Second Example Embodiment

In the optical communication system according to the first example embodiment, an operator and the like can determine an optical communication device being a transmission source of an inspection optical signal from transmission optical communication device identification information in an unassigned frequency band being output from an optical communication device that has received the inspection optical signal. In that case, the operator and the like can determine, from a pair of the optical communication device that has received the inspection optical signal and the optical communication device being the transmission source of the inspection optical signal, an optical path through which the inspection optical signal has passed, and an optical fiber pair connected to an optical switch of a branching unit included in the optical path.

The present example embodiment is an example embodiment related to an optical communication system for automatically determining an optical path through which an inspection optical signal gas passed, and an optical fiber pair connected to an optical switch of a branching unit included in the optical path.

Configuration and Operation

The optical communication system according to the present example embodiment is different in the following points from that in the first example embodiment. Hereinafter, points of the optical communication system according to the present example embodiment different from that in the first example embodiment will be mainly described.

Figure 8:
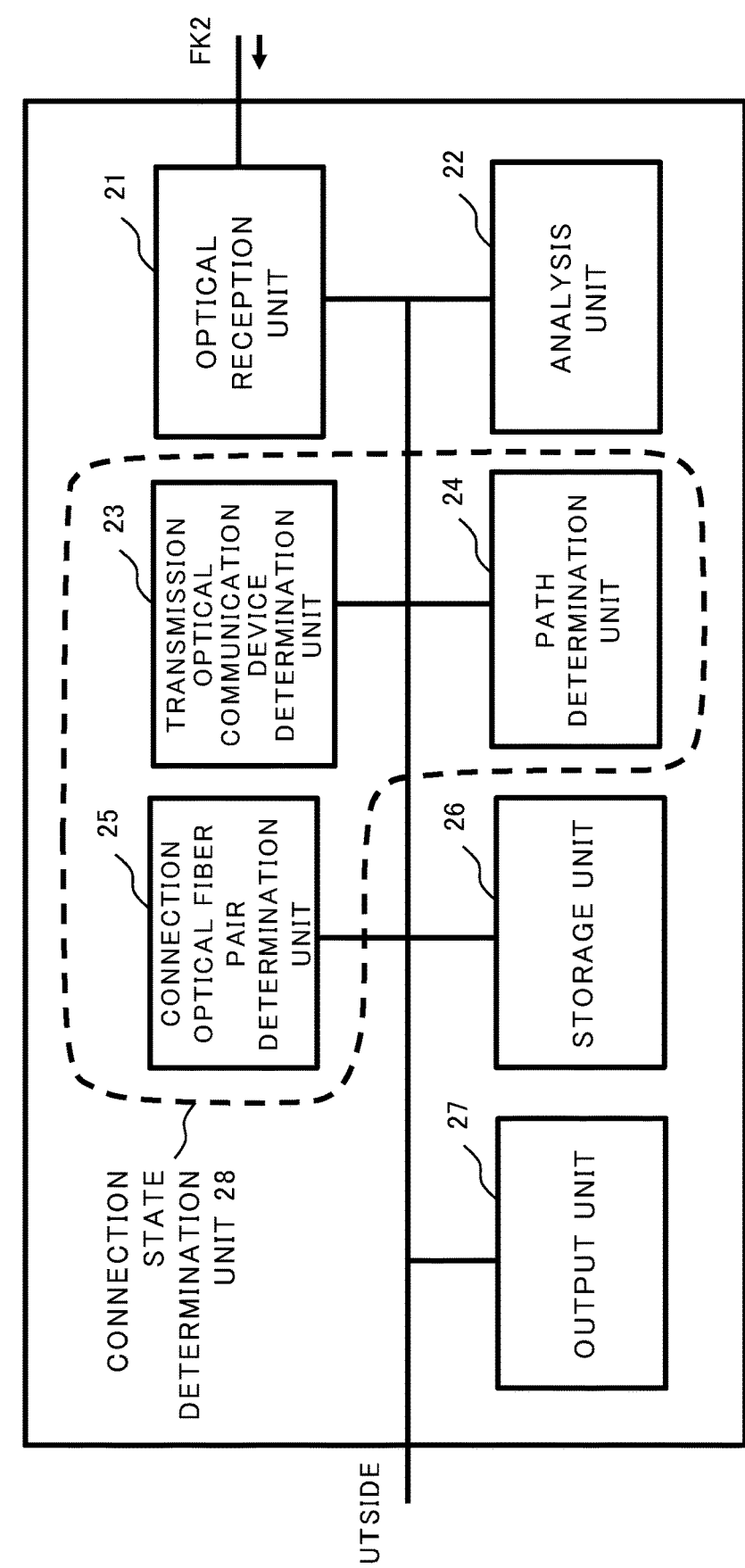
FIG. 8 is a schematic diagram illustrating a configuration example of an optical signal reception unit according to a second example embodiment.
Figure 9A:
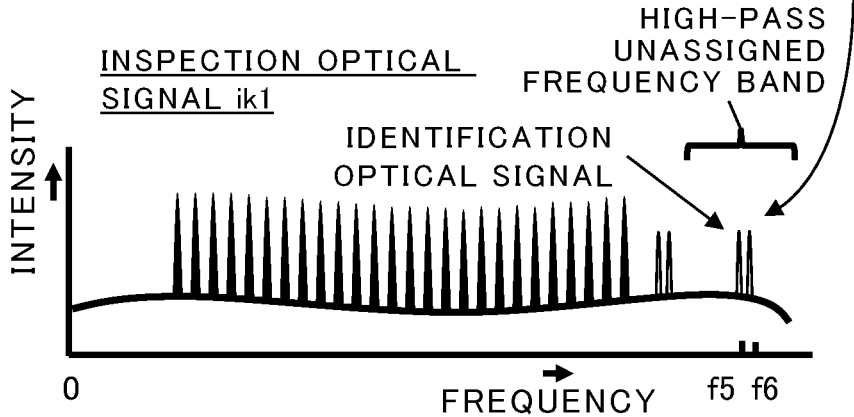
FIG. 9A is an image diagram illustrating an example of an inspection optical signal ik1 from optical communication device K1, according to a third example embodiment.
Figure 9B:
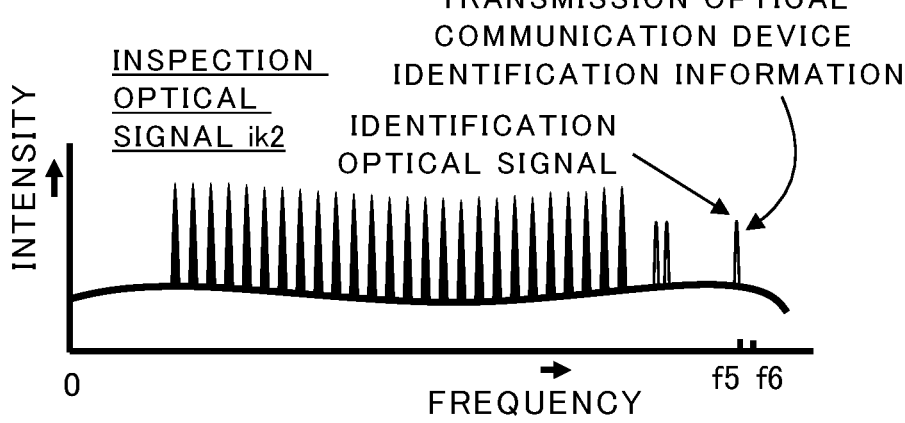
FIG. 9B is an image diagram illustrating an example of an inspection optical signal ik2 from optical communication device K2, according to a third example embodiment.
Figure 9C:
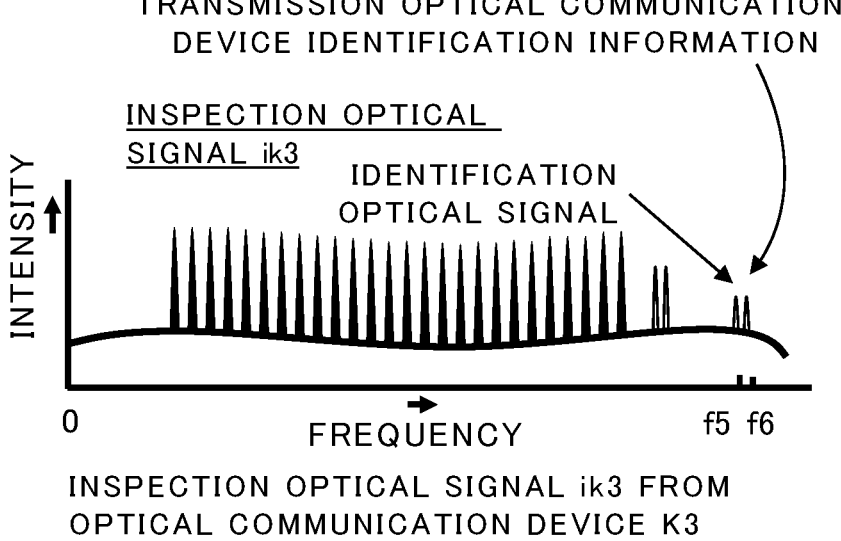
FIG. 9C is an image diagram illustrating an example of an inspection optical signal ik3 from optical communication device K3, according to a third example embodiment.
Figure 9D:
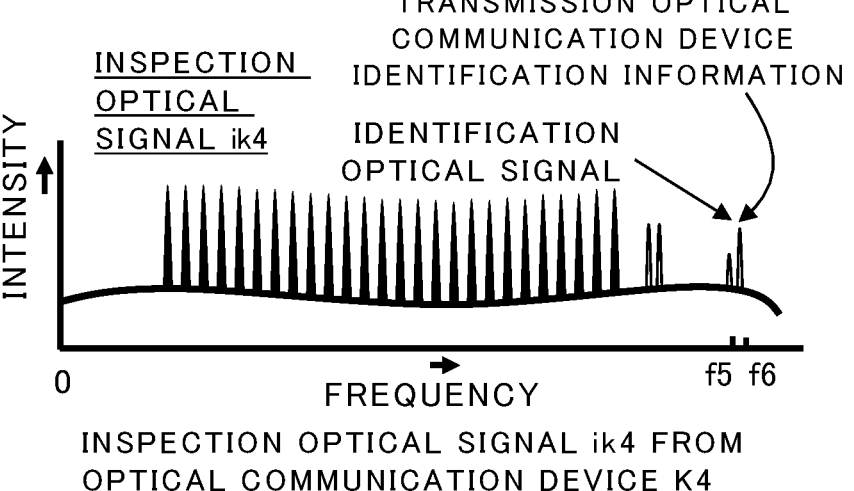
FIG. 9D is an image diagram illustrating an example of an inspection optical signal ik4 from optical communication device K4, according to a third example embodiment.

FIG. 8 is a schematic diagram illustrating a configuration example of the optical signal reception unit 20 according to the present example embodiment illustrated in FIG. 2. The optical signal reception unit 20 according to the present example embodiment includes a transmission optical communication device determination unit 23, a path determination unit 24, and a connection optical fiber pair determination unit 25 in addition to the configuration included in the optical signal reception unit 20 in FIG. 5.

The transmission optical communication device determination unit 23 determines, from transmission optical communication device identification information (see FIG. 6A-FIG. 6D) in a high-pass unassigned frequency band of a frequency characteristic of a reception inspection optical signal being stored in the storage unit 26, an optical communication device (transmission optical communication device) being a transmission source of the received inspection optical signal. The storage unit 26 holds, in advance, correspondence data (first correspondence data) between each piece of the transmission optical communication device identification information and each of the optical communication devices. In that case, the transmission optical communication device determination unit 23 determines the transmission optical communication device from the transmission optical communication device identification information about the reception inspection optical signal and the first correspondence data. The transmission optical communication device determination unit 23 stores a determination result of the transmission optical communication device in the storage unit 26. Further, the transmission optical communication device determination unit 23 causes the output unit 27 to output the determination result of the transmission optical communication device in response to an instruction from the outside, for example.

The path determination unit 24 determines an optical path between an optical communication device (reception optical communication device) including the optical signal reception unit 20 and the transmission optical communication device from the determination result of the transmission optical communication device being stored in the storage unit 26. Herein, it is assumed in an optical submarine cable system that, when optical communication devices being a transmission source and a reception destination of an inspection optical signal are determined, one optical path (inter-optical communication device optical path) between the reception optical communication device and the optical communication device being the transmission source is determined. As in the optical submarine cable system CS illustrated in FIG. 1, the case described above holds true in an optical submarine cable system that does not have a redundant configuration in an optical path between an optical communication device being a transmission source of an inspection optical signal and an optical communication device being a reception destination. Then, it is assumed that the storage unit 26 holds, in advance, correspondence data (second correspondence data) between the inter-optical communication device optical path and the optical communication device being the transmission source. In that case, the path determination unit 24 determines the inter-optical communication device optical path from the optical communication device (transmission optical communication device) being the transmission source and the second correspondence data. The path determination unit 24 stores information indicating the determined inter-optical communication device optical path in the storage unit 26. Further, the path determination unit 24 causes the output unit 27 to output the determination result of the inter-optical communication device optical path in response to an instruction from the outside, for example.

The connection optical fiber pair determination unit 25 determines, from the inter-optical communication device optical path stored in the storage unit 26, connection optical fiber pair information being information indicating two optical fibers (connection optical fiber pair) connected to each optical switch of each branching unit of the inter-optical communication device optical path. Herein, it is assumed that, when the inter-optical communication device optical path is determined, the connection optical fiber pair of each branching unit included in the inter-optical communication device optical path is determined. As in the optical submarine cable system CS illustrated in FIG. 1, the case described above holds true in an optical submarine cable system that does not have a redundant configuration in an optical path between each branching unit and an optical communication device or another branching unit. Then, it is assumed that the storage unit 26 holds, in advance, correspondence data (third correspondence data) between the inter-optical communication device optical path and the connection optical fiber pair of each branching unit included in the inter-optical communication device optical path. In that case, the connection optical fiber pair determination unit 25 determines, from the inter-optical communication device optical path and the third correspondence data, the connection optical fiber pair of each branching unit included in the inter-optical communication device optical path. The connection optical fiber pair determination unit 25 stores, in the storage unit 26, connection optical fiber pair information indicating the connection optical fiber pair of each branching unit included in the determined inter-optical communication device optical path. Further, the connection optical fiber pair determination unit 25 causes the output unit 27 to output the determination result of the inter-optical communication device optical path in response to an instruction from the outside, for example.

The optical signal reception unit 20 has a configuration including a computer, for example.

Note that, when an optical submarine system does not have a redundant configuration of an optical path as described above, transmission optical communication device information, inter-optical communication device optical path information, and connection optical fiber pair information have a relationship that, when one is determined, the others are determined. Herein, the transmission optical communication device information is information indicating a transmission optical communication device. Further, the inter-optical communication device optical path information is information indicating an inter-optical communication device optical path. In that case, all of the transmission optical communication device information, the inter-optical communication device optical path information, and the connection optical fiber pair information are connection state information being information indicating a connection state of an optical path by each branching unit. A combination of the transmission optical communication device determination unit 23, the path determination unit 24, and the connection optical fiber pair determination unit 25 that determine the connection state information is referred to as a connection state determination unit 28.

Effect

First, the optical communication system according to the present example embodiment has a configuration similar to that of the optical communication system according to the first example embodiment, and achieves a similar effect. In addition, in the optical communication system according to the present example embodiment, an optical communication device that has received an inspection optical signal automatically determines an optical communication device being a transmission source of the inspection optical signal, an optical path through which the inspection optical signal has passed, and an optical fiber pair connected to each switch of a branching unit included in the optical path. Thus, the optical communication system according to the present example embodiment can save time and effort for an operator and the like to determine the optical communication device being the transmission source of the inspection optical signal, the optical path through which the inspection optical signal has passed, and the optical fiber pair connected to each switch of the branching unit included in the optical path.

Third Example Embodiment

In the optical communication systems according to the first and second example embodiments, an optical communication device being a transmission source of an inspection optical signal provides transmission optical communication device identification information by reducing or not reducing noise in a predetermined frequency band of an unassigned frequency band. The present example embodiment is an example embodiment related to an optical communication system for setting transmission optical communication device identification information for an inspection optical signal by a signal having a predetermined frequency set in an unassigned frequency band.

Configuration and Operation

A configuration example of the optical communication system according to the present example embodiment is the optical communication system 100 illustrated in FIG. 1. A configuration example of each of the optical communication devices K1 to K4 according to the present example embodiment is the optical communication device K in FIG. 2. The optical communication device K according to the present example embodiment is different in the following points from that described in the section of Background Art. Hereinafter, points of the optical communication device K according to the present example embodiment different from that described in the section of Background Art will be mainly described.

First, an inspection optical signal transmitted from the optical communication device K according to the present example embodiment will be described. FIG. 9A-FIG. 9D are image diagrams illustrating inspection optical signals ik1, ik2, ik3, and ik4 being an example of the inspection optical signal according to the present example embodiment. The inspection optical signals ik1, ik2, ik3, and ik4 in this order are inspection optical signals transmitted from the optical communication devices K1, K2, K3, and K4 in FIG. 1.

The inspection optical signal ik1 includes transmission optical communication device identification information formed of a combination of a signal having relatively high intensity near a frequency f5 in a high-pass unassigned frequency band and a signal having relatively high intensity near a frequency f6. The inspection optical signal ik2 includes transmission optical communication device identification information formed of a signal having relatively high intensity near the frequency f5 in the high-pass unassigned frequency band. The inspection optical signal ik2 does not have a signal near the frequency f6.

The inspection optical signal ik3 includes transmission optical communication device identification information formed of a combination of a signal having relatively low intensity near the frequency f5 in the high-pass unassigned frequency band and a signal having relatively low intensity near the frequency f6. The inspection optical signal ik4 includes transmission optical communication device identification information formed of a combination of a signal having relatively low intensity near the frequency f5 in the high-pass unassigned frequency band and a signal having relatively high intensity near the frequency f6.

The transmission optical communication device identification information indicates an optical communication device being a transmission source of an inspection optical signal by a combination of a frequency and intensity or presence or absence of an optical signal.

Thus, the optical signal reception unit 20 in FIG. 2 can determine which of the optical communication devices K1, K2, K3, and K4 transmits an inspection optical signal by analyzing a frequency, intensity, and presence or absence of an optical signal included in the transmission optical communication device identification information.

Note that the transmission optical communication device identification information may indicate an optical communication device being a transmission source only by a combination of a frequency of an optical signal and presence or absence of the signal. Further, the transmission optical communication device identification information may indicate an optical communication device being a transmission source only by a combination of intensity and presence or absence of an optical signal. In contrast to these, the transmission optical communication device identification information in FIG. 9A-FIG. 9D indicates an optical communication device being a transmission source of an inspection optical signal by a combination of a frequency and intensity or presence or absence of an optical signal. In this way, setting of more kinds of identification optical signals for an unassigned frequency band can be achieved, and more optical communication devices being transmission sources can be identified.

FIG. 10 is a schematic diagram illustrating a configuration example of the optical signal transmission unit 10 illustrated in FIG. 2 that generates and transmits the inspection optical signals ik1 to ik4 in FIG. 9A-FIG. 9D. The optical signal transmission unit 10 in FIG. 10 includes an identification signal generation unit 14 in addition to the configuration included in the optical signal transmission unit 10 in FIG. 4. The identification signal generation unit 14 generates an identification optical signal in FIG. 9A-FIG. 9D, and inputs the identification optical signal to a multiplexing unit 13. The multiplexing unit 13 sets, as optical signals, signals of frequencies of a transmission signal, a monitoring signal, and an identification signal, generates an inspection optical signal by multiplexing the optical signals, and causes the inspection optical signal to be incident on an optical fiber FK1. Description of the optical fiber FK1 is the same as the description of the optical fiber FK1 in FIG. 4.

Note that an optical signal included in the transmission optical communication device identification information in FIG. 9A-FIG. 9D may not have a meaning in information to be carried. Thus, as described in the section of Background Art, an identification optical signal can be provided in an unassigned frequency band that is difficult to be provided with a signal having a meaning in information to be carried. Further, the identification optical signal is used only in such a way that an optical communication device being a transmission source can be identified in the optical signal reception unit 20. Thus, the identification optical signal does not need to have a frequency band as illustrated in FIG. 9A-FIG. 9D. The identification optical signal may be a signal having a wider frequency band, such as noise further added to noise.

Note that the number of branching units and the number of optical communication devices included in the optical communication system according to the present example embodiment are not limited to those in FIG. 1, and may be optional.

Further, in the description above in the present example embodiment, the example in which the transmission optical communication device identification information described above is provided in the high-pass unassigned frequency band of the unassigned frequency band is described. However, a frequency band in which the transmission optical communication device identification information is provided may be any frequency band as long as the frequency band is the unassigned frequency band. The transmission optical communication device identification information may be provided in a low-pass unassigned frequency band. Alternatively, the transmission optical communication device identification information may be provided in both of the low-pass unassigned frequency band and the high-pass unassigned frequency band. When the transmission optical communication device identification information is provided in both of the low-pass unassigned frequency band and the high-pass unassigned frequency band, setting of more kinds of pieces of the transmission optical communication device identification information can be achieved. This is advantageous when the optical communication system according to the present example embodiment includes a greater number of optical communication devices.

Effect

In the optical communication system according to the present example embodiment, an optical communication device being a transmission source of an inspection optical signal provides, as an optical signal, transmission optical communication device identification information to an unassigned frequency band of the inspection optical signal. In this way, the optical communication system according to the present example embodiment can identify an optical communication device (transmission optical communication device) being a transmission source by an output of a frequency characteristic in an unassigned frequency band from an optical communication device that receives an inspection optical signal. In this way, the optical communication system according to the present example embodiment achieves an effect similar to that of the optical communication system according to the first example embodiment.

Fourth Example Embodiment

In an optical communication system according to the present example embodiment, a branching unit included in a submarine optical cable system provides, to an unassigned frequency band of an inspection optical signal to pass, connection optical fiber pair information being information indicating a switching state of an optical path. In this way, the optical communication system according to the present example embodiment can recognize a switching state of an optical path by a branching unit by an output of a frequency characteristic in an unassigned frequency band from an optical communication device that receives an inspection optical signal.

Configuration and Operation

A configuration example of the optical communication system according to the present example embodiment is the optical communication system 100 illustrated in FIG. 1. A configuration example of each of the optical communication devices K1 to K4 according to the present example embodiment is the configuration of the optical communication device K in FIG. 2. Further, the configuration example of the optical signal transmission unit 10 according to the present example embodiment is illustrated in FIG. 4. Further, the configuration example of the optical signal reception unit 20 according to the present example embodiment is illustrated in FIG. 5 or 8.

Branching units B1 and B2 according to the present example embodiment are different in the following points from those described in the section of Background Art. Hereinafter, points of the branching units B1 and B2 according to the present example embodiment different from those described in the section of Background Art will be mainly described.

Figure 11:
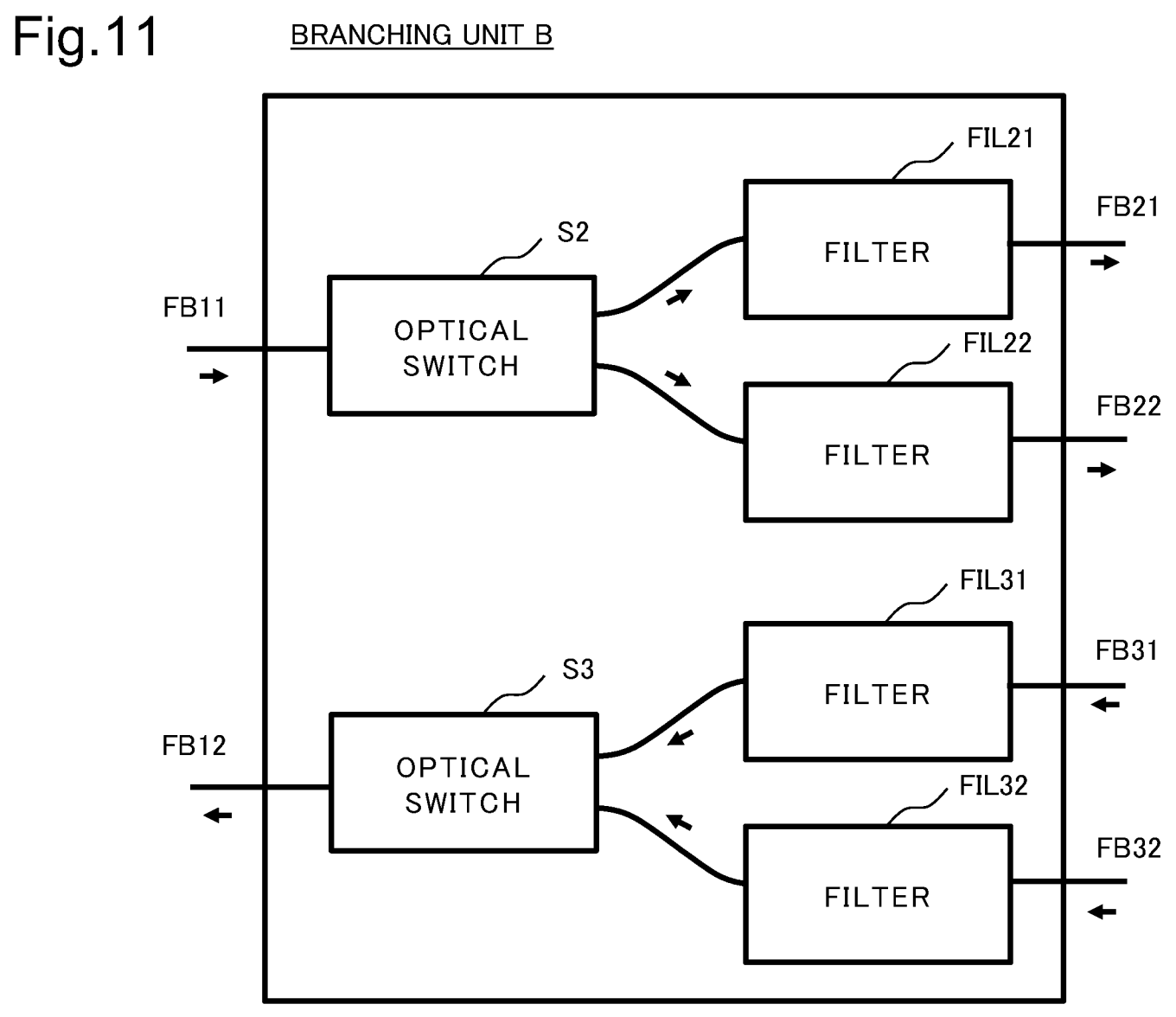

FIG. 11 is a schematic diagram illustrating a configuration of a branching unit B being an example of the branching units B1 and B2 according to the present example embodiment illustrated in FIG. 1. The branching unit B includes optical switches S2 and S3, and optical filters FIL21, FIL22, FIL31, and FIL32. The branching unit B provides, to an inspection optical signal to pass, connection optical fiber pair information being information indicating a switching state of an optical path of each of the optical switches S2 and S3. The branching unit B performs connection optical fiber pair information by reducing noise in an unassigned frequency band of an inspection optical signal by each optical filter.

When the branching unit B is the branching unit B1 in FIG. 1, optical fibers FB11, FB12, FB21, FB22, FB31, and FB32 in this order are F11, F12, F31, F51, F32, and F52 in FIG. 1. Further, when the branching unit B is the branching unit B2 in FIG. 1, the optical fibers FB11, FB12, FB21, FB22, FB31, and FB32 in this order are F22, F21, F41, F52, F42, and F51 in FIG. 1. Note that an arrow provided to each optical fiber indicates a traveling direction of an inspection optical signal.

Herein, the optical switch S2 is assumed to connect the optical fiber FB11 to the optical fiber FB21. In that case, the optical fiber FB11 and the optical fiber FB22 are separated. In that case, an inspection optical signal traveling to the right through the optical fiber FB11 passes through the optical filter FIL21 and travels to the right through the optical fiber FB21. At this time, the optical filter FIL21 reduces noise in a first frequency band included in an unassigned frequency band of an inspection optical signal to pass, and thus provides connection optical fiber pair information to the inspection optical signal.

Further, the optical switch S2 is assumed to connect the optical fiber FB11 to the optical fiber FB22. In that case, the optical fiber FB11 and the optical fiber FB21 are separated. In that case, an inspection optical signal traveling to the right through the optical fiber FB11 passes through the optical filter FIL22 and travels to the right through the optical fiber FB22. At this time, the optical filter FIL22 reduces noise in a second frequency band included in the unassigned frequency band of an inspection optical signal to pass, and thus provides connection optical fiber pair information to the inspection optical signal.

Further, the optical switch S3 is assumed to connect the optical fiber FB12 to the optical fiber FB31. In that case, the optical fiber FB12 and the optical fiber FB32 are separated. In that case, an inspection optical signal traveling to the left through the optical fiber FB31 passes through the optical filter FIL31 and travels to the left through the optical fiber FB12. At this time, the optical filter FIL31 reduces noise in a third frequency band included in the unassigned frequency band of an inspection optical signal to pass, and thus provides connection optical fiber pair information to the inspection optical signal.

Further, the optical switch S3 is assumed to connect the optical fiber FB12 to the optical fiber FB32. In that case, the optical fiber FB12 and the optical fiber FB31 are separated. In that case, an inspection optical signal traveling to the left through the optical fiber FB32 passes through the optical filter FIL32 and travels to the left through the optical fiber FB12. At this time, the optical filter FIL32 reduces noise in a fourth frequency band included in the unassigned frequency band of an inspection optical signal to pass, and thus provides connection optical fiber pair information to the inspection optical signal.

Note that an optical filter that does not reduce an unassigned frequency band of an inspection optical signal is also assumed as the optical filters FIL21, FIL22, FIL31, and FIL32. In that case, information indicated by no reduction in an unassigned frequency band of an inspection optical signal is connection optical fiber pair information provided to the inspection optical signal. In that case, it indicates that an optical filter is not actually present, and an optical fiber that does not reduce intensity of an optical signal in an unassigned frequency band is present instead. In the present example embodiment, such an optical fiber is considered to be an optical filter that does not reduce intensity of an optical signal in an unassigned frequency band of an inspection optical signal.

In the optical communication system according to the present example embodiment, frequency bands in which noise is reduced are different between the optical filters FIL21 and FIL22, and frequency bands in which noise is reduced are different between the optical filters FIL31 and FIL32. Further, it is assumed that the branching units B1 and B2 are both included in a signal path through which an inspection optical signal passes in the optical submarine cable system CS in FIG. 1. In that case, in the signal path, frequency bands in which noise in an unassigned frequency band of an inspection optical signal is attenuated by an optical filter are different between the branching units B1 and B2. In the optical communication system according to the present example embodiment, when an inspection optical signal received by an optical communication device has a different optical path to be passed, connection optical fiber pair information is always provided to the inspection optical signal by reducing noise in a different frequency band of an unassigned frequency band. In this way, the optical communication system according to the present example embodiment can determine, from an output of a frequency characteristic in an unassigned frequency band from an optical communication device that receives an inspection signal, a switching state of an optical path in a branching unit through which the received inspection optical signal has passed.

Next, a specific example of assigning, to each optical filter, connection optical fiber pair information indicated by a reduction in noise in a predetermined frequency band that can achieve the case described above will be described.

FIG. 12A-FIG. 12E are schematic diagrams illustrating an example of a candidate for connection optical fiber pair information to be assigned to each optical filter. Note that FIG. 12A-FIG. 12E illustrate only a portion of a high-pass unassigned frequency band of an inspection optical signal.

Figure 12A:
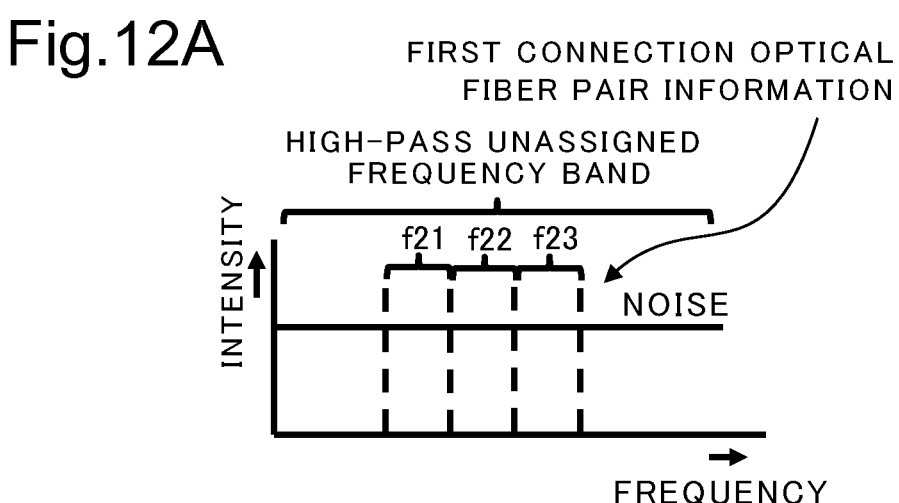
FIG. 12A is a schematic diagram illustrating an example of first connection optical fiber pair information.

In the high-pass unassigned frequency band in FIG. 12A, noise in a frequency band of any of frequency bands f21, f22, and f23 is not reduced. Information indicated by no reduction in noise in the frequency band of any of the frequency bands f21, f22, and f23 is connection optical fiber pair information provided to an inspection optical signal having the high-pass unassigned frequency band. The connection optical fiber pair information is referred to as first connection optical fiber pair information.

Figure 12B:
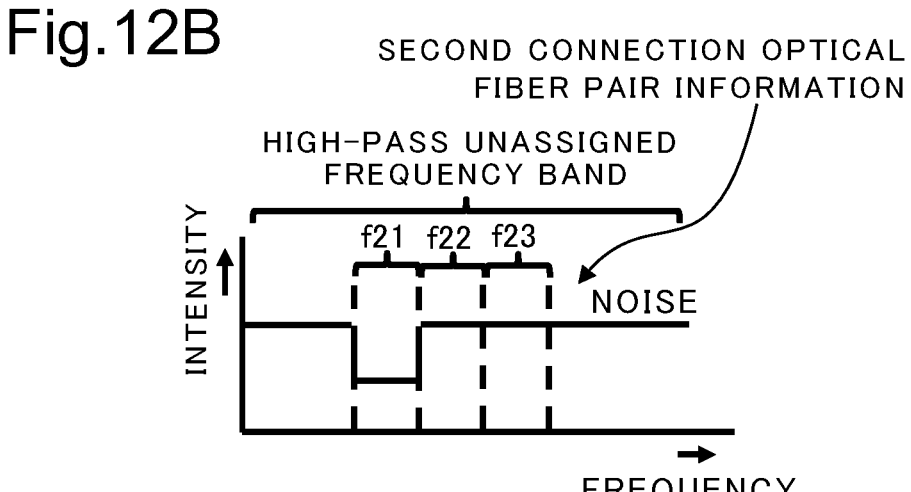
FIG. 12B is a schematic diagram illustrating an example of second connection optical fiber pair information.

In the high-pass unassigned frequency band in FIG. 12B, noise in only the frequency band f21 of the frequency bands f21, f22, and f23 is reduced. Information indicated by a reduction in noise in only the frequency band f21 is connection optical fiber pair information provided to an inspection optical signal having the high-pass unassigned frequency band. The connection optical fiber pair information is referred to as second connection optical fiber pair information.

Figure 12C:
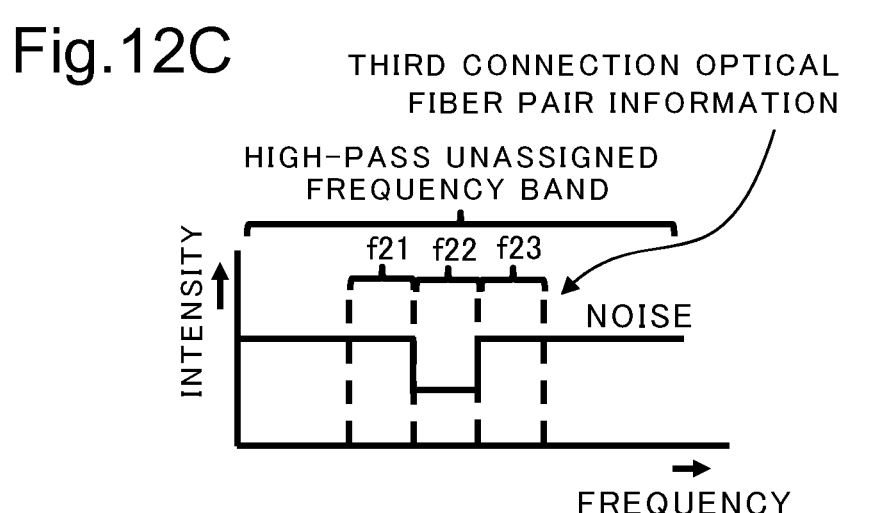
FIG. 12C is a schematic diagram illustrating an example of third connection optical fiber pair information.
Figure 15A:
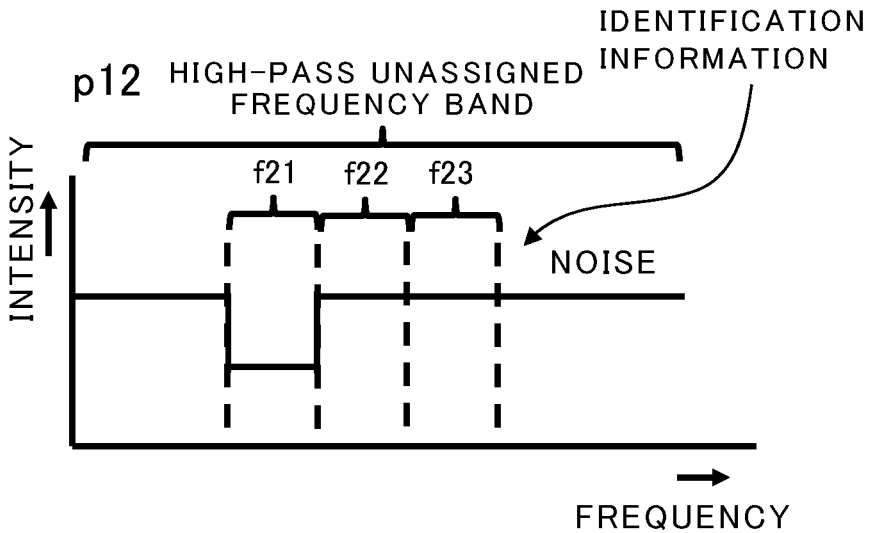
FIG. 15A is an image diagram illustrating a frequency characteristic of a reception inspection optical signal in a high-pass unassigned frequency band associated with combination p12.
Figure 15B:
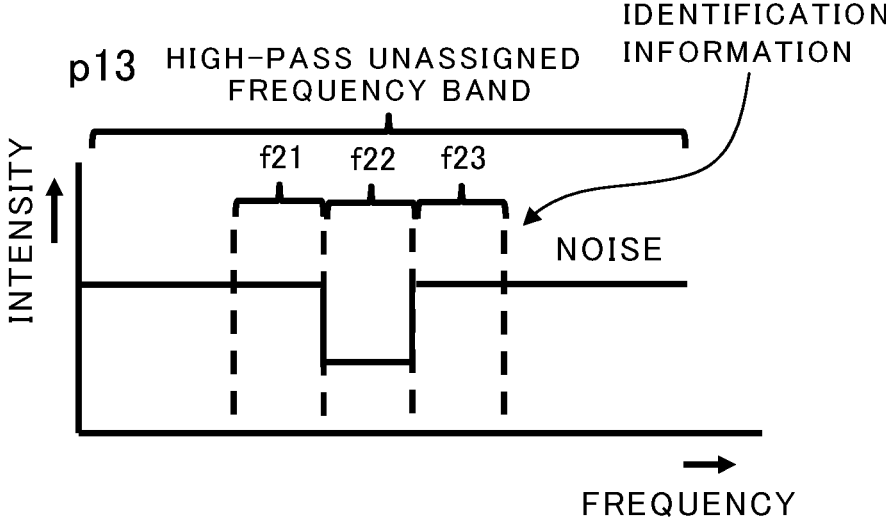
FIG. 15B is an image diagram illustrating a frequency characteristic of a reception inspection optical signal in a high-pass unassigned frequency band associated with combination p13.
Figure 15C:
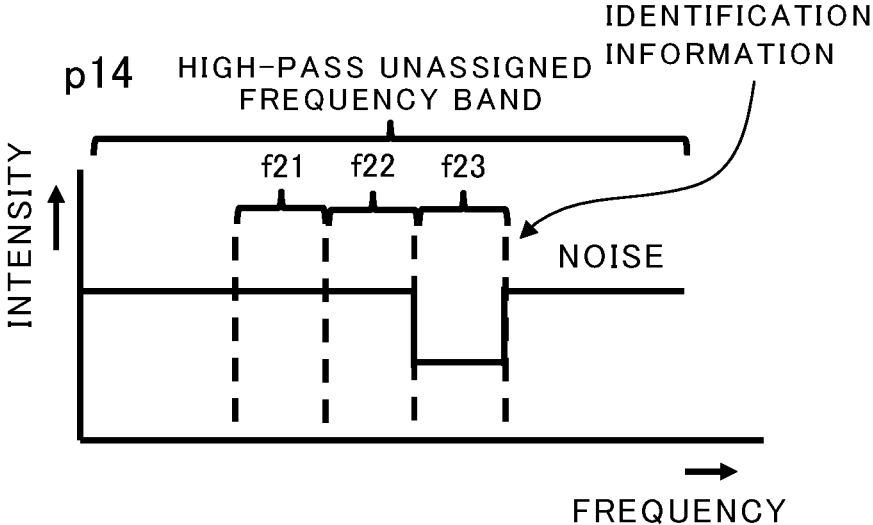
FIG. 15C is an image diagram illustrating a frequency characteristic of a reception inspection optical signal in a high-pass unassigned frequency band associated with combination p14.
Figure 15D:
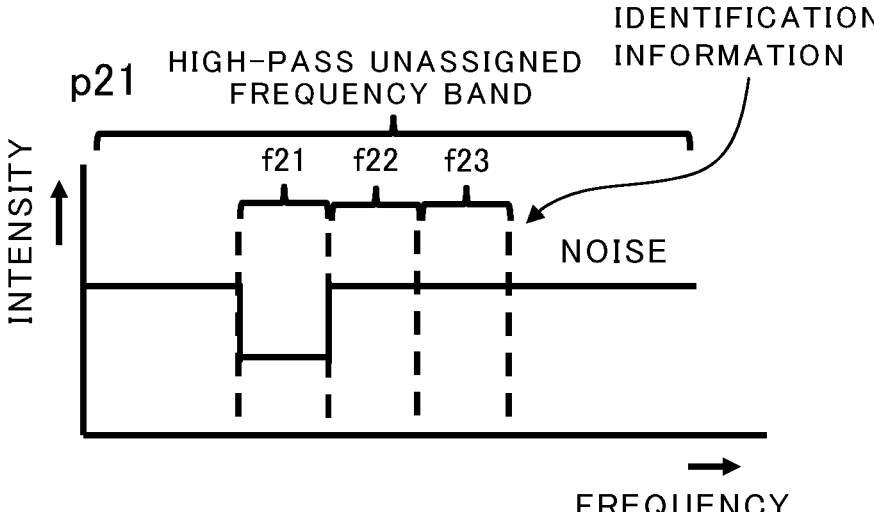
FIG. 15D is an image diagram illustrating a frequency characteristic of a reception inspection optical signal in a high-pass unassigned frequency band associated with combination p21.
Figure 16E:
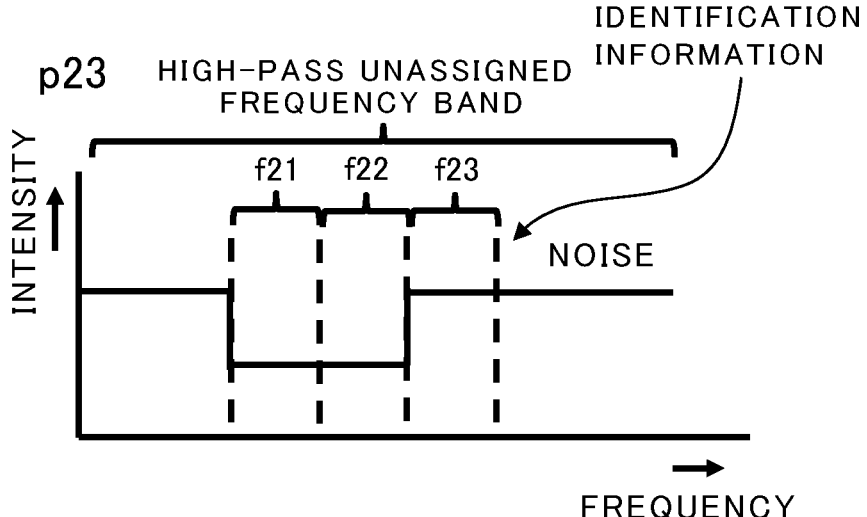
FIG. 16E is an image diagram illustrating a frequency characteristic of the reception inspection optical signal in a high-pass unassigned frequency band associated with combination p23.
Figure 16F:
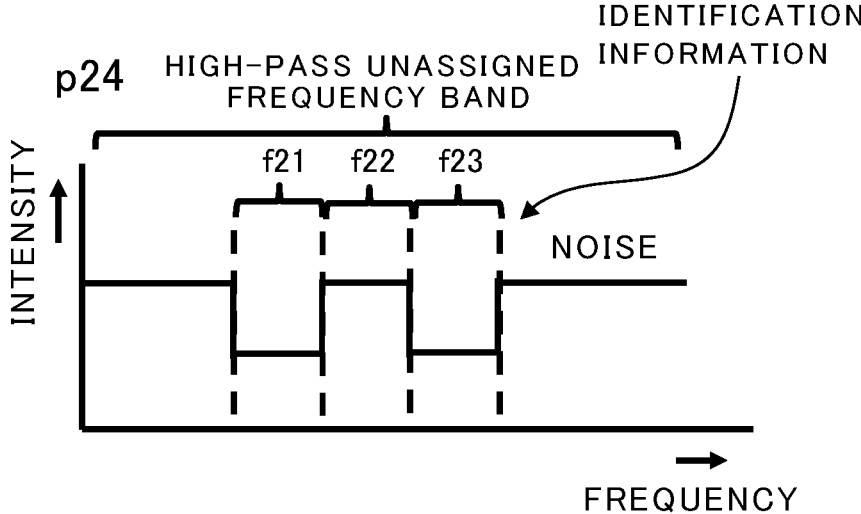
FIG. 16F is an image diagram illustrating a frequency characteristic of the reception inspection optical signal in a high-pass unassigned frequency band associated with combination p24.
Figure 16G:
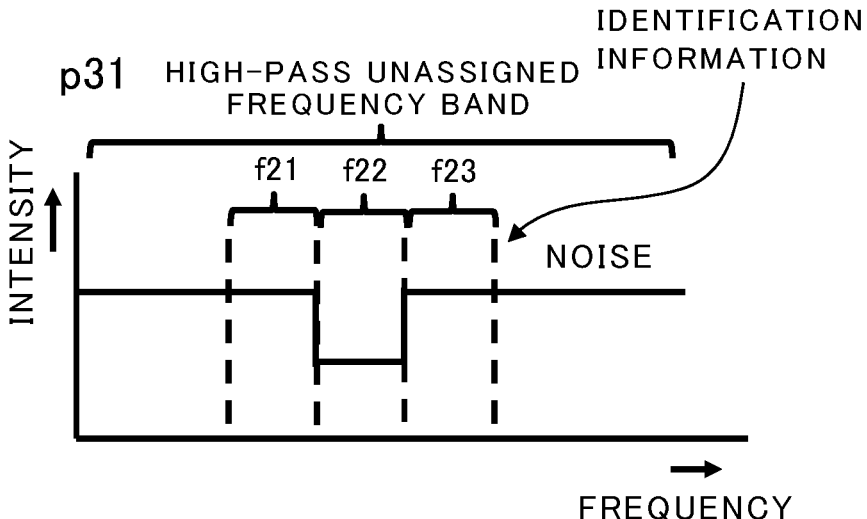
FIG. 16G is an image diagram illustrating a frequency characteristic of the reception inspection optical signal in a high-pass unassigned frequency band associated with combination p31.
Figure 16H:
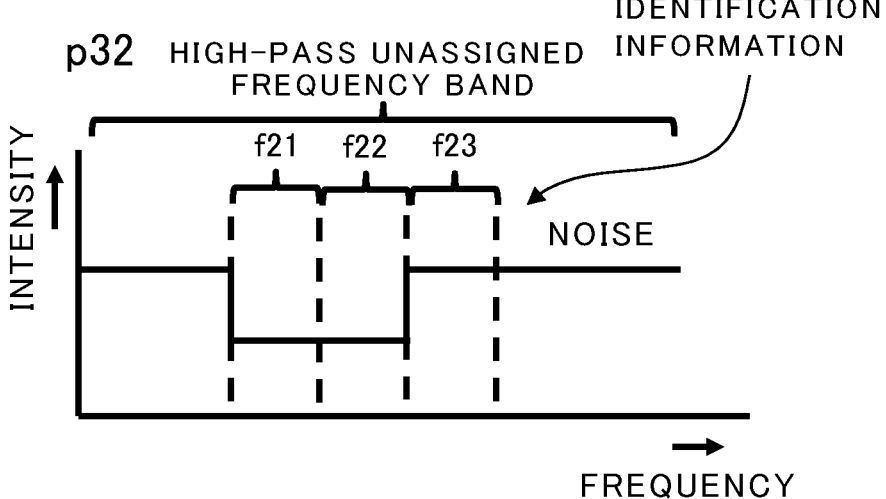
FIG. 16H is an image diagram illustrating a frequency characteristic of the reception inspection optical signal in a high-pass unassigned frequency band associated with combination p32.
Figure 17I:
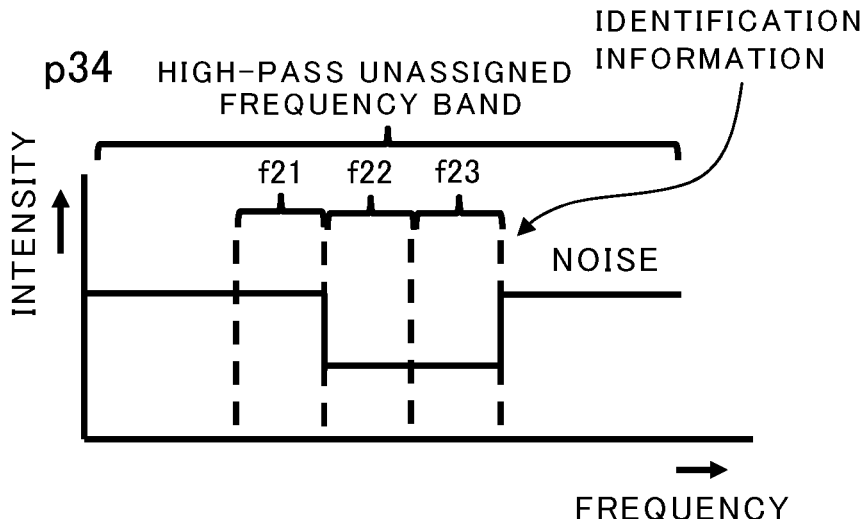
FIG. 17I is an image diagram illustrating a frequency characteristic of the reception inspection optical signal in the high-pass unassigned frequency band associated with combination p34.
Figure 17J:
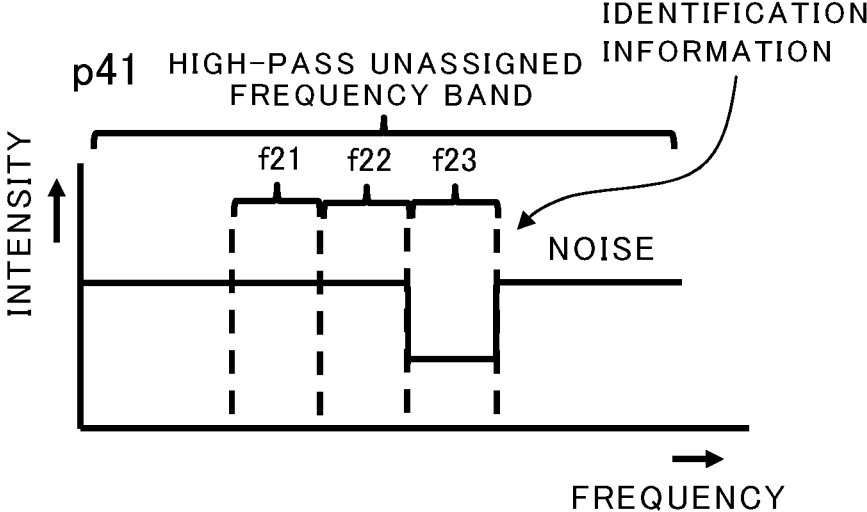
FIG. 17J is an image diagram illustrating a frequency characteristic of the reception inspection optical signal in the high-pass unassigned frequency band associated with combination p41.
Figure 17K:
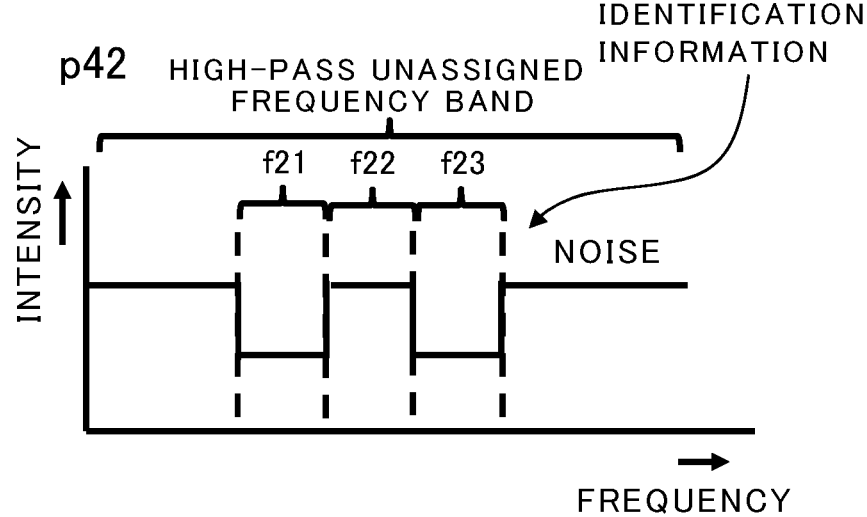
FIG. 17K is an image diagram illustrating a frequency characteristic of the reception inspection optical signal in the high-pass unassigned frequency band associated with combination p42.
Figure 17L:
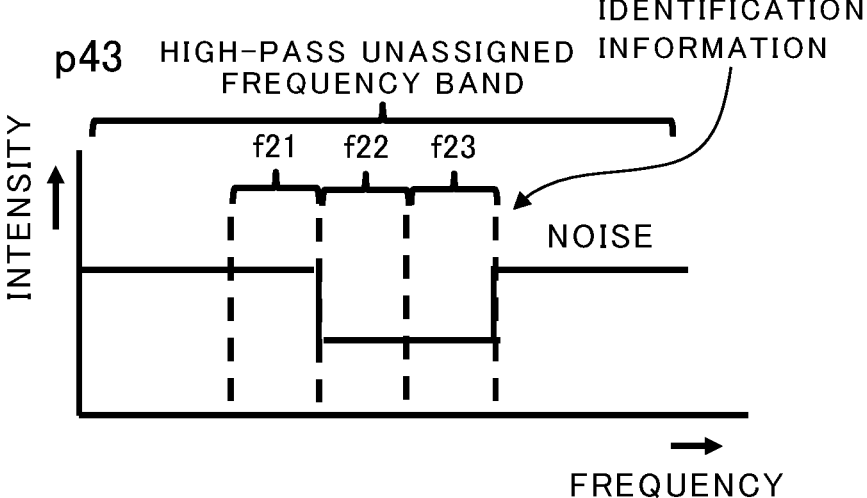
FIG. 17L is an image diagram illustrating a frequency characteristic of the reception inspection optical signal in the high-pass unassigned frequency band associated with combination p43.

In the high-pass unassigned frequency band in FIG. 12C, noise in only the frequency band f22 of the frequency bands f21, f22, and f23 is reduced. Information indicated by a reduction in noise in only the frequency band f22 is connection optical fiber pair information provided to an inspection optical signal having the high-pass unassigned frequency band. The connection optical fiber pair information is referred to as third connection optical fiber pair information.

In the high-pass unassigned frequency band in FIG. 12D, noise in only the frequency band f23 of the frequency bands f21, f22, and f23 is reduced. Information indicated by a reduction in noise in only the frequency band f23 is connection optical fiber pair information provided to an inspection optical signal having the high-pass unassigned frequency band. The connection optical fiber pair information is referred to as fourth connection optical fiber pair information.

In the high-pass unassigned frequency band in FIG. 12E, noise in the frequency bands f21 and f23 of the frequency bands f21, f22, and f23 is reduced. Information indicated by a reduction in noise in only the frequency bands f1 and f23 is connection optical fiber pair information provided to an inspection optical signal having the high-pass unassigned frequency band. The connection optical fiber pair information is referred to as fifth connection optical fiber pair information.

FIG. 13 is a schematic diagram illustrating assignment of the first connection optical fiber pair information to the fifth connected optical fiber pair information in FIG. 12A-FIG. 12E to each connection optical fiber pair in each branching unit. Herein, each connection optical fiber pair is an optical path included in each of the branching units B1 and B2 in FIG. 1 and connected by the optical switches S2 and S3 in FIG. 11. In FIG. 13, a connection optical fiber pair is indicated by a pair of a first optical fiber and a second optical fiber being two optical fibers connected by the optical switch S2 or S3. Any of the optical filters FIL21, FIL22, FIL31, and FIL32 in FIG. 11 is present between the two connected optical fibers. The optical filter present between the two optical fibers provides connection optical fiber pair information of a kind as illustrated in FIG. 13 to inspection optical information to pass.

In the assignment in FIG. 13, when an optical path to be connected is different, different connection optical fiber pair information among the first connection optical fiber pair information to the fifth connection optical fiber pair information is provided. Further, when an inspection optical signal passes through a plurality of branching units, different connection optical fiber pair information among the first connection optical fiber pair information to the fifth connection optical fiber pair information is provided for each branching unit. Note that the branching unit B1 and the branching unit B2 have the common frequency bands f21 to f23 of the first connection optical fiber pair information to the fifth connection optical fiber pair information to be provided.

By these, in each reception optical communication device, identification information (see FIG. 14, FIG. 15A-FIG. 15D, FIG. 16E-FIG. 16H, and FIG. 17I-FIG. 17L) is different for each optical path through which an inspection optical signal has passed. Thus, in each reception optical communication device, an optical path through which a reached inspection optical signal has passed can be determined from identification information about the inspection optical signal.

In the assignment in FIG. 13, furthermore, when two optical paths to be connected are the same, the same connection optical fiber pair information is provided regardless of a direction of traveling of an optical signal.

This point is not necessarily essential to determine an optical path through which an inspection optical signal has passed, but is a preferable point. The reason is that a kind of necessary connection optical fiber pair information can be reduced by providing the same connection optical fiber pair information regardless of a direction of traveling of an optical signal. Thus, in the assignment in FIG. 13, it is sufficient that a kind of necessary connection optical fiber pair information is five kinds of the first connection optical fiber pair information to the fifth connection optical fiber pair information.

Note that, specifically, the assignment of the first connection optical fiber pair information to the fifth connected optical fiber pair information in FIG. 13 to each connection optical fiber pair can be achieved by causing the following processing to be performed by a computer and the like, for example.

First, it is assumed that, when two optical paths to be connected are the same, the same connection optical fiber pair information is provided regardless of a direction of traveling of an optical signal. For example, it is assumed that the same optical fiber pair information is provided to an optical fiber pair of the optical fibers F11 and F51 and an optical fiber pair of the optical fibers F52 and F12. The same applies to the other optical fiber pairs.

Then, the computer and the like determine all combinations in which each optical fiber pair is combined with the first connection optical fiber pair information to the fifth connection optical fiber pair information. Then, the computer determines, for all the determined combinations, whether identification information about a received inspection optical signal varies by an optical path in each reception optical communication device. Then, the computer selects a combination in which identification information about a received inspection optical signal varies by an optical path in each received optical communication device. In this way, the assignment of the first connection optical fiber pair information to the fifth connected optical fiber pair information to a connection optical fiber pair is performed.

Note that, in the example in FIG. 13, the above-described assignment of five pieces of connection optical fiber pair information of the first connection optical fiber pair information to the fifth connected optical fiber pair information can be performed. However, when the above-described assignment of five pieces of the connection optical fiber pair information cannot be performed, the computer and the like increase a kind of the connection optical fiber pair information to six or more, and perform processing similar to that described above.

FIG. 14 is a diagram illustrating a correspondence example between a combination of a transmission optical communication device and a reception optical communication device, and a high-pass unassigned frequency band of an inspection optical signal received by the reception optical communication device. Herein, the transmission optical communication device is an optical communication device that has transmitted the inspection optical signal. Further, the reception optical communication device is an optical communication device that has received the inspection optical signal.

FIG. 15A-FIG. 15D, FIG. 16E-FIG. 16H, and FIG. 17I-FIG. 17L illustrate a frequency characteristic in a high-pass unassigned frequency band associated with a symbol that is indicated for the combination of the transmission optical communication device and the reception optical communication device in FIG. 14 and is acquired by providing a two-digit number after an alphabet "p". A combination of high noise and low noise of portions in the frequency bands f21, f22, and f23 of each high-pass unassigned frequency band in FIG. 15A-FIG. 15D, FIG. 16E-FIG. 16H, and FIG. 17I-FIG. 17L is identification information indicating an inter-optical communication device optical path through which an inspection optical signal has passed.

When the assignment of each piece of the connection optical fiber pair information in FIG. 13 to each connection optical fiber pair is performed, an inspection optical signal that has reached a certain optical communication device is provided with all pieces of the connection optical fiber pair information provided by each branching unit through which the inspection optical signal has passed, and all pieces of the connection optical fiber pair information form identification information. Then, when an optical path through which the inspection optical signal has passed is different in all optical communication devices that have received the inspection optical signal, the identification information is different. As described above, the reason is that the assignment in FIG. 13 is set in such a way that frequency bands of pieces of connection optical fiber pair information provided by a plurality of branching units do not overlap each other when an inspection optical signal passes through the branching units. Hereinafter, a case where, when an optical path through which an inspection optical signal has passed is different, identification information is different will be specifically described.

An optical path through which an inspection optical signal received by the optical communication device K1 in FIG. 1 passes includes three kinds of an optical path from the optical communication device K2 through the branching units B2 and B1, an optical path from the optical communication device K3 through the branching unit B1, and an optical path from the optical communication device K4 through the branching units B2 and B1. Pieces of identification information about the inspection optical signal that has passed through the optical paths are included in p21 in FIG. 15D, p31 in FIG. 16G, and p41 in FIG. 17J in this order, and are different from one another. Thus, the optical communication device K1 can determine an inter-optical communication device optical path through which the received inspection optical signal has passed. Further, when the inter-optical communication device optical path through which the inspection optical signal has passed is determined, a switching state of the optical path in the branching unit included in the inter-optical communication device optical path is determined. Thus, the optical communication device K1 can determine a switching state of the optical path in the branching unit through which the received inspection optical signal has passed.

Further, an optical path through which an inspection optical signal received by the optical communication device K2 in FIG. 1 passes includes three kinds of an optical path from the optical communication device K1 through the branching units B1 and B2, an optical path from the optical communication device K3 through the branching units B1 and B2, and an optical path from the optical communication device K4 through the branching unit B2. Pieces of identification information about the inspection optical signal that has passed through the optical paths are included in a high-pass unassigned frequency band of p12 in FIG. 15A, p32 in FIG. 16H, and p42 in FIG. 17K in this order, and are different from one another. Thus, the optical communication device K2 can determine an inter-optical communication device optical path through which the received inspection optical signal has passed. Further, when the inter-optical communication device optical path through which the inspection optical signal has passed is determined, a switching state of the optical path in the branching unit included in the inter-optical communication device optical path is determined. Thus, the optical communication device K2 can determine a switching state of the optical path in the branching unit through which the received inspection optical signal has passed.

Further, an optical path through which an inspection optical signal received by the optical communication device K3 in FIG. 1 passes includes three kinds of an optical path from the optical communication device K1 through the branching unit B1, an optical path from the optical communication device K2 through the branching units B1 and B2, and an optical path from the optical communication device K4 through the branching units B2 and B1. Pieces of identification information about the inspection optical signal that has passed through the optical paths are included in a high-pass unassigned frequency band of p13 in FIG. 15B, p23 in FIG. 16E, and p43 in FIG. 17L in this order, and are different from one another. Thus, the optical communication device K3 can determine an inter-optical communication device optical path through which the received inspection optical signal has passed. Further, when the optical path through which the inspection optical signal has passed is determined, a switching state of the optical path in the branching unit included in the optical path is determined. Thus, the optical communication device K3 can determine a switching state of the optical path in the branching unit through which the received inspection optical signal has passed.

Further, an optical path through which an inspection optical signal received by the optical communication device K4 in FIG. 1 passes includes three kinds of an optical path from the optical communication device K1 through the branching units B1 and B2, an optical path from the optical communication device K2 through the branching unit B2, and an optical path from the optical communication device K3 through the branching units B1 and B2. Frequency characteristics in a high-pass unassigned frequency band of the inspection optical signal that has passed through the optical paths are p14 in FIG. 15C, p24 in FIG. 16F, and p34 in FIG. 17I in this order, and are different from one another. Thus, the optical communication device K4 can determine the optical path through which the received inspection optical signal has passed. Further, when the optical path through which the inspection optical signal has passed is determined, a switching state of the optical path in the branching unit included in the optical path is determined. Thus, the optical communication device K4 can determine a connection optical fiber pair indicating a switching state of the optical path in the branching unit through which the received inspection optical signal has passed.

Note that the number of branching units and the number of optical communication devices included in the optical communication system according to the present example embodiment are not limited to those in FIG. 1.

Further, in the description above in the present example embodiment, the example in which the connection optical fiber pair information described above is provided in the high-pass unassigned frequency band of the unassigned frequency band is described. However, a frequency band in which the connection optical fiber pair information is provided may be any frequency band as long as the frequency band is the unassigned frequency band. The connection optical fiber pair information may be provided in a low-pass unassigned frequency band. Alternatively, the connection optical fiber pair information may be provided in both of the low-pass unassigned frequency band and the high-pass unassigned frequency band. When the connection optical fiber pair information is provided in both of the low-pass unassigned frequency band and the high-pass unassigned frequency band, setting of more kinds of pieces of the connection optical fiber pair information can be achieved. This is advantageous when the optical communication system according to the present example embodiment includes a greater number of branching units and the number of optical communication devices accordingly increases.

Effect

In the optical communication system according to the present example embodiment, an optical filter is provided in an optical path (connection optical fiber pair) connected by a branching unit, and the optical filter reduces noise in a predetermined frequency band in an unassigned frequency band of an inspection optical signal, and thus provides optical path connection information to the inspection optical signal. In the optical communication system according to the present example embodiment, when an optical path through which a received inspection optical signal has passed is different in each optical communication device, provision of optical path connection information to each connection optical fiber pair is performed in such a way that a frequency characteristic in an unassigned frequency band of the inspection optical signal is different. In that case, a frequency characteristic in an unassigned frequency band is different when an optical path through which a received inspection optical signal has passed is different, the optical path through which the inspection optical signal has passed can be determined. Further, when the optical path through which the inspection optical signal has passed is determined, a switching state of the optical path in the branching unit included in the optical path is determined. Thus, a connection optical fiber pair indicating a switching state of the optical path in the branching unit through which the received inspection optical signal has passed can be determined.

Fifth Example Embodiment

In the optical communication systems according to the first to fourth example embodiments, a connection optical fiber pair connected to an optical switch provided in an optical path through which a received inspection optical signal has passed can be determined. However, a connection optical fiber pair connected to an optical switch in an optical path through which a received inspection optical signal has not passed cannot be determined. Thus, a connection optical fiber pair connected to all optical switches of a branching unit cannot be recognized.

In an optical communication system according to the present example embodiment, each optical communication device transmits, by communication, information about a connection optical fiber pair connected to each optical switch in a range recognized by the optical communication device. In this way, a management device can recognize information about a connection optical fiber pair connected to all optical switches included in an optical submarine cable system.

[Configuration and Operation]

Figure 18:
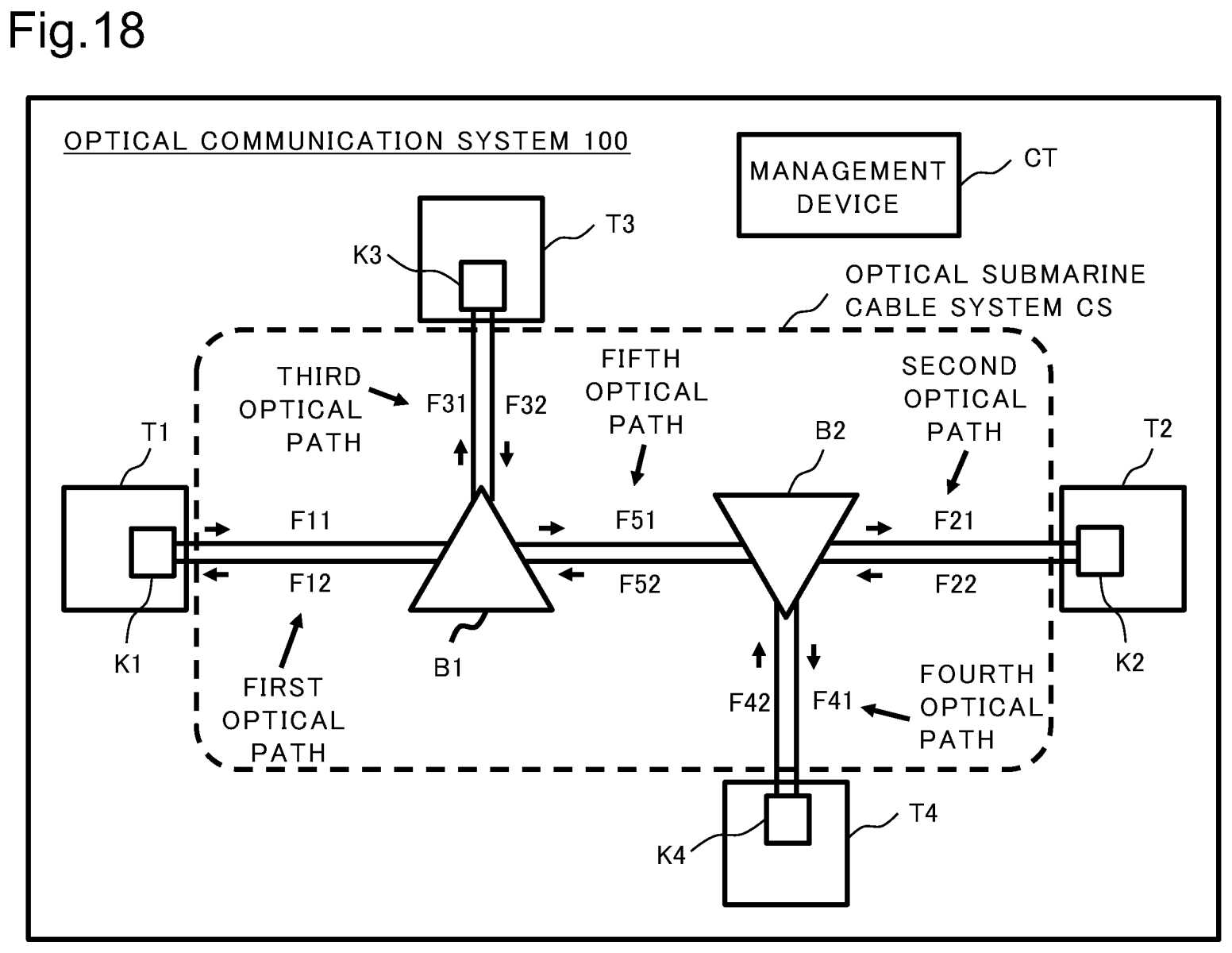

FIG. 18 is a schematic diagram illustrating a configuration of an optical communication system 100 being an example of an optical communication system according to the present example embodiment. The optical communication system 100 in FIG. 18 includes a management device CT in addition to the configuration included in the optical communication system 100 in FIG. 1.

The management device CT performs communication with optical communication devices K1 to K4. The communication is performed by, for example, the Internet. The management device CT transmits, to each optical communication device, connection optical fiber pair information connected to each optical switch in each branching unit recognized by the optical communication device. Herein, the connection optical fiber pair information is information indicating two optical fibers connected to each other by each optical switch.

The management device CT integrates pieces of connection optical fiber pair information received from each optical communication device, and generates and outputs a list of the pieces of connection optical fiber pair information of each optical switch of each branching unit (each of branching units B1 and B2) included in an optical submarine cable system CS. The output is, for example, display onto a display unit, a sound output, transmission to another device.

The management device CT may transmit a list of the pieces of connection optical fiber pair information to all or some of the optical communication devices K1 to K4.

Note that the management device CT may be included in any of land terminals T1 to T4. Further, the number of branching units and the number of optical communication devices included in the optical communication system according to the present example embodiment are not limited to those in FIG. 18, and may be optional.

Figure 19:
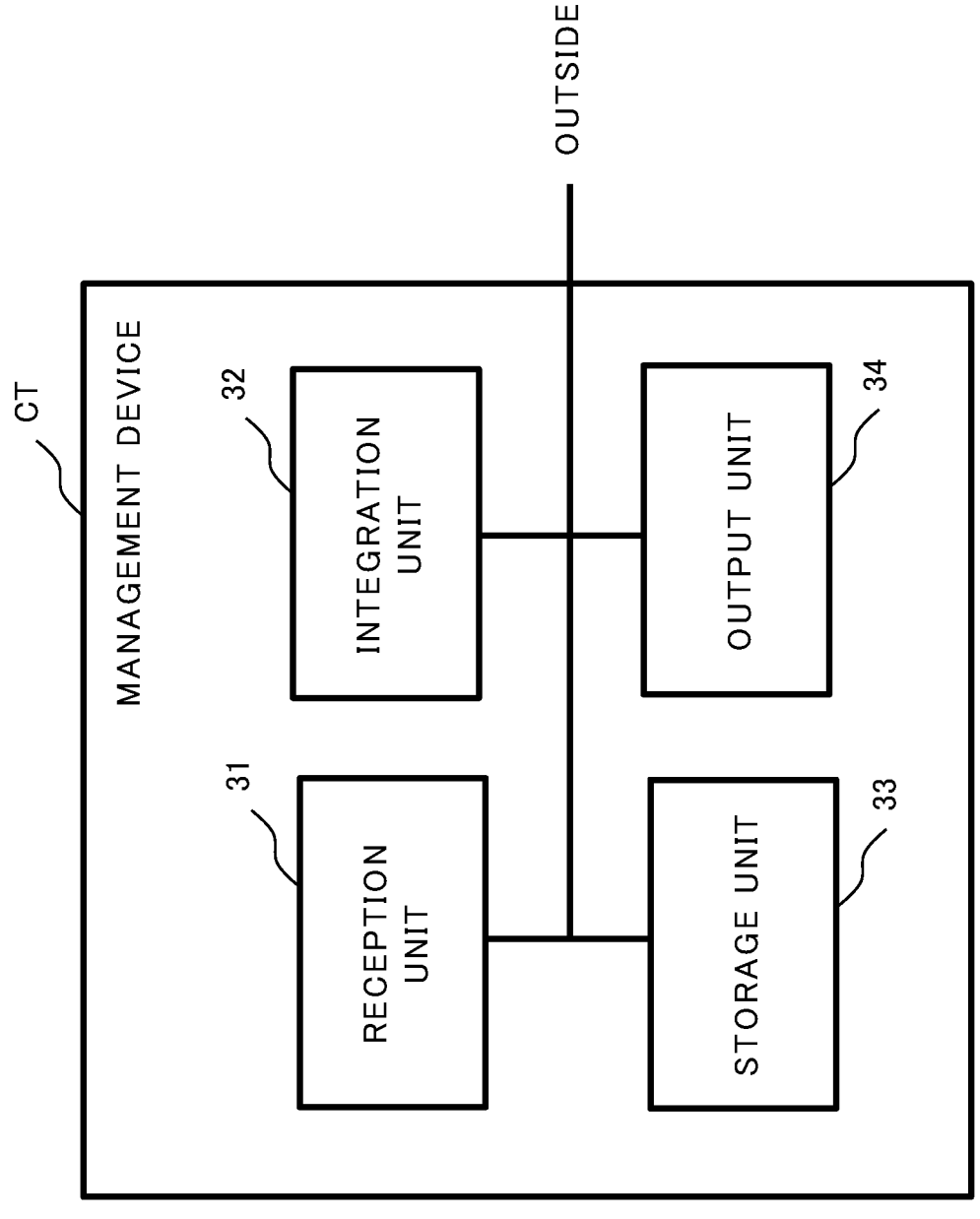
FIG. 19 is a schematic diagram illustrating a configuration example of a management device.

FIG. 19 is a schematic diagram illustrating a configuration example of the management device CT in FIG. 18. The management device CT in FIG. 19 includes a reception unit 31, an integration unit 32, a storage unit 33, and an output unit 34. The reception unit 31 stores information transmitted from the optical communication devices K1 to K4 in FIG. 18 in the storage unit 33. When the information transmitted from the optical communication devices K1 to K4 in FIG. 18 and received by the reception unit 31 is connection state information described above, the integration unit 32 integrates the connection situation information.

Herein, the connection state information transmitted from each optical communication device and received by the reception unit 31 is assumed to be connection optical fiber pair information. In that case, the integration unit 32 integrates pieces of connection optical fiber pair information transmitted from each optical communication device and received by the reception unit 31, and generates a list of the pieces of connection optical fiber pair information of each optical switch of each branching unit (each of the branching units B1 and B2) included in the optical submarine cable system CS. The integration unit 32 may perform the integration by using, for example, artificial intelligence. The integration unit 32 stores the created list of the pieces of connection optical fiber pair information in the storage unit 33. The integration unit 32 causes the output unit 34 to output the list of the pieces of connection optical fiber pair information according to an instruction from the outside, for example. The integration unit 32 may cause each of the optical communication devices in FIG. 18 to transmit the list of the pieces of connection optical fiber pair information to the output unit 34 being a transmission device.

Alternatively, the connection state information transmitted from each optical communication device and received by the reception unit 31 is assumed to be inter-optical communication device optical path information. In that case, the integration unit 32 integrates pieces of inter-optical communication device optical path information transmitted from each optical communication device and received by the reception unit 31, and generates a list of the pieces of inter-optical communication device optical path information formed in the optical submarine cable system CS. Then, the integration unit 32 creates a list of pieces of connection optical fiber pair information from the generated list of the pieces of inter-optical communication device optical path information.

Alternatively, the connection state information transmitted from each optical communication device and received by the reception unit 31 is assumed to be an optical communication device being a transmission source of an inspection optical signal when viewed from the optical communication device that transmits the connection state information. In that case, the integration unit 32 integrates a combination (transmission/reception optical communication device pair) of the reception optical communication device in which the reception unit 31 receives the transmission from each optical communication device, and the optical communication device being the transmission source when viewed from the reception optical communication device, and generates a list of the transmission/reception optical communication device pairs. Then, the integration unit 32 creates, from the created list of the transmission/reception optical communication device pairs, a list of pieces of inter-optical communication device optical path information by, for example, correspondence information held in the storage unit 33 between transmission/reception optical communication device pair and the inter-optical communication device optical path information. Then, the integration unit 32 creates, from the created list of the pieces of inter-optical communication device optical path information, a list of pieces of connection optical fiber pair information by, for example, correspondence information held in the storage unit 33 between the inter-optical communication device optical path information and the connection optical fiber pair information. Then, the integration unit 32 stores the created list of the pieces of connection optical fiber pair information in the storage unit 33.

Alternatively, the connection state information transmitted from each optical communication device and received by the reception unit 31 is assumed to be inter-optical communication device optical path information. In that case, the integration unit 32 integrates pieces of inter-optical communication device optical path information transmitted from each optical communication device and received by the reception unit 31, and generates a list of the pieces of inter-optical communication device optical path information formed in the optical submarine cable system CS. Then, the integration unit 32 creates, from the created list of the pieces of inter-optical communication device optical path information, a list of pieces of connection optical fiber pair information by, for example, correspondence information held in the storage unit 33 between the inter-optical communication device optical path information and the connection optical fiber pair information. Then, the integration unit 32 stores the created list of the pieces of connection optical fiber pair information in the storage unit 33.

Note that, with a configuration of an optical submarine cable system being more complicated, even when a transmission optical communication device and an optical path are determined in a reception optical communication device of an inspection optical signal, a connection state of an optical fiber of an optical switch in each branching unit may not be determined. For example, the reason is that, when an inspection optical signal reaches a reception optical communication device via a branching unit, a different path via the same branching unit in the same connection state may be present. In that case, even when an optical path through which the inspection optical signal has passed can be determined, a connection state of each branching unit cannot be determined. In that case, the integration unit 32 determines a connection state of each branching unit by integrally judging a list of transmission/reception optical communication device pairs and a list of pieces of inter-optical communication device optical path information. For the integration judgment, for example, use of artificial intelligence and the like are conceivable.

The integration unit 32 causes the output unit 34 to output the created list of the pieces of connection optical fiber pair information according to an instruction from the outside, for example. Alternatively, the integration unit 32 may cause the output unit 34 to output a list of transmission/reception optical communication device pairs and a list of pieces of inter-optical communication device optical path information.

The management device CT is, for example, a computer. The storage unit 33 holds, in advance, a program and information for the management device CT to perform the operation described above. The storage unit 33 transmits information instructed by each configuration of the management device CT to an instructed configuration of the management device CT. The storage unit 33 stores the information instructed by each configuration of the management device CT.

The output unit 34 is, for example, a display device, a sound output device, or a transmission device. The output unit 34 outputs instructed information to an instructed output destination according to an instruction from each configuration of the management device CT.

Note that each of the optical communication devices in FIG. 18 includes, for example, the optical signal reception unit 20 illustrated in FIG. 8. In that case, the output unit 27 being a transmission device transmits the information described above to the reception unit 31 in FIG. 19.

Effect

In an optical communication system according to the present example embodiment, each optical communication device transmits, to a management device by communication, information about a connection optical fiber pair connected to each optical switch in a range recognized by the optical communication device. In this way, the management device recognizes connection optical fiber pair information connected to each optical switch of each branching unit included in an optical submarine cable system. In this way, the management device can recognize a connection state of each optical switch.

Figure 20:
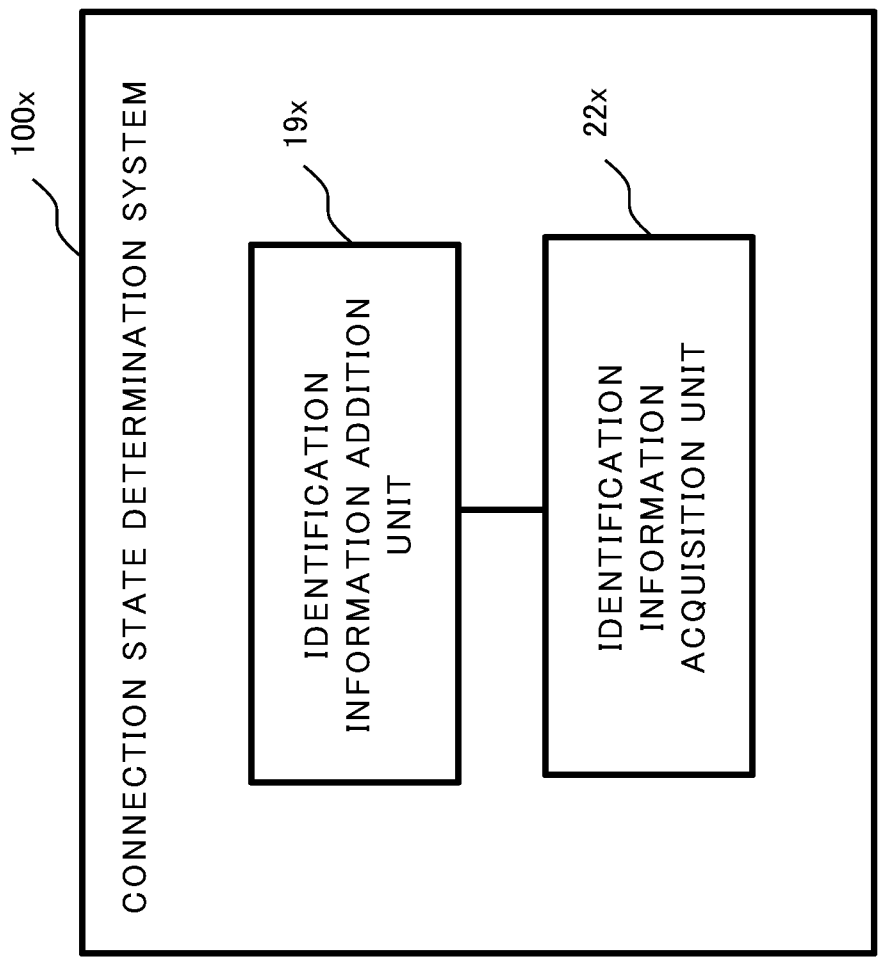
FIG. 20 is a schematic diagram illustrating a minimum configuration of a connection state determination system according to an example embodiment.

FIG. 20 is a schematic diagram illustrating a configuration of a connection state determination system 100x being a minimum configuration of a connection state determination system according to an example embodiment. The connection state determination system 100x includes an identification information addition unit 19*x* and an identification information acquisition unit 22*x*.

The identification information addition unit 19*x* adds identification information different for each inter-optical communication device optical path through which an inspection optical signal passes, to an unassigned frequency band at a time of reception of the inspection optical signal by a second optical communication device, by the inter-optical communication device optical path. Herein, the inter-optical communication device optical path is the optical path including an optical fiber between optical communication devices and is included in an optical submarine cable system. The optical submarine cable system includes a submarine optical cable including the optical path, and a branching unit that switches connection of the optical path. Further, the inspection optical signal is an optical signal for an inspection to be transmitted from a first optical communication device to the second optical communication device. Further, the unassigned frequency band is a frequency band other than a frequency band assigned to optical communication.

The identification information acquisition unit 22*x* outputs the identification information about the inspection optical signal received by the second optical communication device.

With the configuration described above, the connection state determination system 100*x* can determine information indicating a connection state of the optical path in the branching unit by the output identification information about the inspection optical signal received by the second optical communication device. Thus, the connection state determination system 100*x* can confirm a connection state of the optical path by the branching unit at a time of an operation inspection of the optical submarine cable system.

Thus, the connection state determination system 100*x* with the above-described configuration achieves the effect described in the section of [Advantageous Effects of Invention].

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

Supplementary Note 1

A connection state determination system including:
an identification information addition means for adding identification information different for each inter-optical communication device optical path through which an inspection optical signal being an optical signal for an inspection to be transmitted from a first optical communication device to a second optical communication device passes, to an unassigned frequency band being a frequency band other than a frequency band assigned to optical communication at a time of reception of the inspection optical signal by the second optical communication device, by the inter-optical communication device optical path being an optical communication device optical path being an optical fiber between optical communication devices and being included in an optical submarine cable system, the optical submarine cable system including a submarine optical cable including the optical path, and a branching unit that switches connection of the optical path; and
an identification information acquisition means for outputting the identification information about the inspection optical signal received by the second optical communication device.

Supplementary Note 2

The connection state determination system according to supplementary note 1, wherein
the identification information is indicated by a reduction in intensity of noise of the inspection optical signal in a predetermined frequency band included in the unassigned frequency band.

Supplementary Note 3

The connection state determination system according to supplementary note 2, wherein
the identification information is added by an optical filter through which the inspection optical signal generated by the first optical communication device passes.

Supplementary Note 4

The connection state determination system according to supplementary note 3, wherein
the optical filter is included in the first optical communication device.

Supplementary Note 5

The connection state determination system according to supplementary note 3, wherein
the optical filter is included in the branching unit.

Supplementary Note 6

The connection state determination system according to supplementary note 1, wherein
the identification information is indicated by a signal of the inspection optical signal present in the unassigned frequency band.

Supplementary Note 7

The connection state determination system according to supplementary note 6, wherein
the identification information is generated by the first optical communication device.

Supplementary Note 8

The connection state determination system according to any one of supplementary notes 1 to 7, further including
a connection state determination means for determining, from the identification information, connection state information being information indicating a connection state of the optical path in the branching unit.

Supplementary Note 9

The connection state determination system according to supplementary note 8, wherein the connection state information includes first optical communication device information being information indicating the first optical communication device, and the connection state determination means includes a transmission optical communication device determination means for determining the first optical communication device information from the identification information acquired by an identification information acquisition means.

Supplementary Note 10

The connection state determination system according to supplementary note 8 or 9, wherein the connection state determination means further includes a path determination means for determining inter-optical communication device optical path information being information indicating the inter-optical communication device optical path from information indicating the first optical communication device determined by a transmission optical communication device determination means.

Supplementary Note 11

The connection state determination system according to supplementary note 10, wherein the connection state determination means further includes a connection optical fiber pair determination means for determining, from the inter-optical communication device optical path information, connection optical fiber pair information being information indicating a connection optical fiber pair that is included in the inter-optical communication device optical path and is a pair of the optical fibers connected to an optical switch included in the branching unit.

Supplementary Note 12

The connection state determination system according to supplementary note 11, further including an integration means for integrating the connection state information transmitted from a plurality of the connection state determination means.

Supplementary Note 13

A connection state determination method including:

adding identification information different for each inter-optical communication device optical path through which an inspection optical signal being an optical signal for an inspection to be transmitted from a first optical communication device to a second optical communication device passes, to an unassigned frequency band being a frequency band other than a frequency band assigned to optical communication at a time of reception of the inspection optical signal by the second optical communication device, by the inter-optical communication device optical path being an optical path including an optical fiber between optical communication devices and being included in an optical submarine cable system, the optical submarine cable system including a submarine optical cable including the optical path, and a branching unit that switches connection of the optical path;

acquiring the identification information about the inspection optical signal received by the second optical communication device; and determining, from the identification information, connection state information being information indicating a connection state of the optical path in the branching unit.

Herein, the "optical fiber" is, for example, the optical fibers F11, F12, F21, F22, F31, F32, F41, F42, F51, and F52 in FIG. 1 or 18. Further, the "optical path" is, for example, the first optical path, the second optical path, the third optical path, the fourth optical path, and the fifth optical path in FIG. 1 or 18. Further, the "submarine optical cable" is, for example, a submarine optical cable provided with the optical fiber.

Further, the "branching unit" is, for example, the branching units B1 and B2 in FIG. 1 or 18. Further, the "optical submarine cable system" is, for example, the optical submarine cable system CS in FIG. 1 or 18. Further, the "optical communication device" is, for example, the optical communication devices K1, K2, K3, K4 in FIG. 1 or 18, or the optical communication device K in FIG. 2.

Further, the "inter-optical communication device optical path" is, for example, the optical path between two optical communication devices. Further, the "first optical communication device" is, for example, any of the optical communication devices. Further, the "second optical communication device" is, for example, any of the optical communication devices in which the inter-device optical path is formed between the first optical communication device and the second optical communication device. Further, the "inspection optical signal" is, for example, the inspection optical signals ik1, ik2, ik3, and ik4 in FIG. 6A-FIG. 6D or FIG. 9A-FIG. 9D.

Further, the "unassigned frequency band" is, for example, the low-pass unassigned frequency band or the high-pass unassigned frequency band in FIG. 3, and the high-pass unassigned frequency band in FIG. 6A-FIG. 6D, FIG. 9A-FIG. 9D, FIG. 12A-FIG. 12E, FIG. 15A-FIG. 15D, FIG. 16E-FIG. 16H, or FIG. 17I-FIG. 17L. Further, the "identification information" is, for example, the low-pass unassigned frequency band in FIG. 3, or the high-pass unassigned frequency band in FIG. 3, FIG. 6A-FIG. 6D, FIG. 9A-FIG. 9D, FIG. 12A-FIG. 12E, FIG. 15A-FIG. 15D, FIG. 16E-FIG. 16H, or FIG. 17I-FIG. 17L. Further, the "identification information addition unit" is, for example, the optical filter FIL1 in FIG. 7, the optical filters FIL21, FIL22, FIL31, and FIL32 in FIG. 11, the identification signal generation unit 14 in FIG. 10, or the identification information addition unit 19x in FIG. 20.

Further, the "identification information acquisition unit" is, for example, the analysis unit 22 in FIG. 5 or 8, or the identification information acquisition unit 22x in FIG. 20. Further, the "connection state information" is, for example, as described above, information indicating an optical communication device being a transmission source of an inspection optical signal, an optical path through which an inspection optical signal has passed, or an optical fiber pair connected to an optical switch of a branching unit included in an optical path through which an inspection optical signal has passed. Further, the "connection state determination unit" is, for example, the connection state determination unit 28 in FIG. 8.

Further, the "connection state determination system" is, for example, the optical communication system 100 in FIG. 1 or 18, or the connection state determination system 100x in FIG. 20. Further, the "optical filter" is, for example, the optical filter FIL1 in FIG. 7, or the optical filters FIL21, FIL22, FIL31, and FIL32 in FIG. 11. Further, the "transmission optical communication device determination unit" is, for example, the transmission optical communication device determination unit 23 in FIG. 8. Further, the "path determination unit" is, for example, the path determination unit 24 in FIG. 8. Further, the "connection optical fiber pair determination unit" is, for example, the connection optical fiber pair determination unit in FIG. 8. Further, the "integration unit" is, for example, the management device CT in FIG. 18 or 19, or the integration unit 32 in FIG. 19.

This application is based upon and claims the benefit of priority from Japanese patent application No. 2021-016376, filed on Feb. 4, 2021, the disclosure of which is incorporated herein in its entirety by reference.

REFERENCE SIGNS LIST

- 10 Optical signal transmission unit
- 11 Transmission signal generation unit
- 12 Monitoring signal generation unit
- 13 Multiplexing unit
- 14 Identification signal generation unit
- 19$x$ Identification information addition unit
- 20 Optical signal reception unit
- 21 Optical reception unit
- 22 Analysis unit
- 22$x$ Identification information acquisition unit
- 23 Transmission optical communication device determination unit
- 24 Path determination unit
- 25 Connection optical fiber pair determination unit
- 26 Storage unit
- 27 Output unit
- 28 Connection state determination unit
- 100 Optical communication system
- 100$x$ Connection state determination system
- T1, T2, T3, T4 Land terminal
- K, K1, K2, K3, K4 Optical communication device
- F11, F12, F21, F22, F31, F32, F41, F42, F51, F52, FB11, FB12, FB21,
- B22, FB31, FB32, FK1, FK1', FK2 Optical fiber
- B, B1, B2 Branching unit
- CS Optical submarine cable system
- ik, ik1, ik, ik3, ik4 Inspection optical signal
- FIL1, FIL21, FIL22, FIL31, FIL32 Optical filter
- S2, S3 Optical switch
- f1, f2, f3, f21, f22, f23, f24 Frequency band
- f5, f6 Frequency

What is claimed is:

1. A connection state determination system comprising:
an optical submarine cable system including a submarine optical cable and a branching unit, wherein
the submarine optical cable includes an optical path including an optical fiber,
the branching unit switches connection of the optical path, and
the optical submarine cable system includes inter-optical communication device optical paths being optical paths including optical fibers between optical communication devices;
a first optical communication device; and
a second optical communication device, wherein
an inspection optical signal is transmitted from the first optical communication device to the second optical communication device, an unassigned frequency band is a frequency band other than a frequency band assigned to optical communication at a time of reception of the inspection optical signal by the second optical communication device,
optical filters add identification information different for each inter-optical communication device optical path through which the inspection optical signal passes to the unassigned frequency band,
the identification information is added by the optical filters through which the inspection optical signal generated by the first optical communication device passes,
the identification information is added by a reduction in intensity of noise of the inspection optical signal in predetermined frequency bands included in the unassigned frequency band,
different optical filters reduce noise in different frequency bands of the unassigned frequency band, and
the second optical communication device outputs the identification information about the inspection optical signal received by the second optical communication device.

2. The connection state determination system according to claim 1, wherein
the optical filters are included in the first optical communication device.

3. The connection state determination system according to claim 1, wherein
the optical filters are included in the branching unit.

4. The connection state determination system according to claim 1, wherein
the second optical communication device determines, from the identification information, connection state information being information indicating a connection state of the optical path in the branching unit.

5. The connection state determination system according to claim 4, wherein
the connection state information includes first optical communication device information being information indicating the first optical communication device, and
the second optical communication device determines the first optical communication device information from the identification information.

6. The connection state determination system according to claim 5, wherein
the second optical communication device determines inter-optical communication device optical path information being information indicating the inter-optical communication device optical path from information indicating the first optical communication device.

7. The connection state determination system according to claim 6, wherein
the second optical communication device determines, from the inter-optical communication device optical path information, connection optical fiber pair information being information indicating a connection optical fiber pair that is included in the inter-optical communication device optical path and is a pair of the optical fibers connected to an optical switch included in the branching unit.

8. The connection state determination system according to claim 7, further comprising
a management device configured to integrate the connection state information.

9. The connection state determination system according to claim 2, wherein
the second optical communication device determines, from the identification information, connection state information being information indicating a connection state of the optical path in the branching unit.

10. The connection state determination system according to claim 3, wherein the second optical communication device determines, from the identification information, connection state information being information indicating a connection state of the optical path in the branching unit.

11. A connection state determination method comprising:

adding, by optical filters, identification information different for each inter-optical communication device optical path through which an inspection optical signal passes, to an unassigned frequency band, wherein the inspection optical signal is transmitted from a first optical communication device to a second optical communication device, the inter-optical communication device optical path is an optical path including an optical fiber between optical communication devices and is included in an optical submarine cable system, the optical submarine cable system includes a submarine optical cable including optical paths, and a branching unit that switches connection of the optical paths, the unassigned frequency band is a frequency band other than a frequency band assigned to optical communication at a time of reception of the inspection optical signal by the second optical communication device, the identification information is added by the optical filters through which the inspection optical signal generated by the first optical communication device passes, the identification information is added by a reduction in intensity of noise of the inspection optical signal in predetermined frequency bands included in the unassigned frequency band, and different optical filters reduce noise in different frequency bands of the unassigned frequency band;

acquiring the identification information about the inspection optical signal received by the second optical communication device; and determining, from the identification information, connection state information being information indicating a connection state of the optical path in the branching unit.

* * * * *